(12) United States Patent
Ramaswamy et al.

(10) Patent No.: US 9,565,473 B2
(45) Date of Patent: *Feb. 7, 2017

(54) METHODS AND APPARATUS TO MAINTAIN AUDIENCE PRIVACY WHILE DETERMINING VIEWING OF VIDEO-ON-DEMAND PROGRAMS

(71) Applicant: The Nielsen Company (US), LLC., Schaumburg, IL (US)

(72) Inventors: Arun Ramaswamy, Tampa, FL (US); Robert A. Luff, Wittman, MD (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/223,560

(22) Filed: Mar. 24, 2014

(65) Prior Publication Data
US 2014/0208341 A1    Jul. 24, 2014

Related U.S. Application Data

(63) Continuation of application No. 13/762,025, filed on Feb. 7, 2013, now Pat. No. 8,707,340, which is a
(Continued)

(51) Int. Cl.
*H04H 60/32* (2008.01)
*H04N 21/442* (2011.01)
(Continued)

(52) U.S. Cl.
CPC ............ *H04N 21/442* (2013.01); *H04H 20/14* (2013.01); *H04H 60/372* (2013.01); *H04H 60/40* (2013.01);
(Continued)

(58) Field of Classification Search
CPC ................ H04N 21/442; H04N 21/254; H04N 21/25866; H04N 21/44222; H04N 21/47202; H04N 21/6582; H04N 21/8352
See application file for complete search history.

(56) References Cited

U.S. PATENT DOCUMENTS

| 5,341,216 A | 8/1994 | Hoffart |
| 5,355,161 A | 10/1994 | Bird et al. |

(Continued)

FOREIGN PATENT DOCUMENTS

| CN | 1346571 | 4/2002 |
| CN | 101593210 | 12/2009 |

(Continued)

OTHER PUBLICATIONS

Patent Examination Report No. 1, Issued by Intellectual Property Australia in connection with Australian Patent Application No. 2011203053, on Jul. 24, 2012, 3 pages.

(Continued)

*Primary Examiner* — Joshua Taylor
(74) *Attorney, Agent, or Firm* — Hanley, Flight & Zimmerman, LLC

(57) ABSTRACT

Methods and apparatus to maintain audience privacy while determining viewing of video-on-demand (VOD) programs are disclosed. An example method disclosed herein comprises obtaining subscriber metering data from a site metering device monitoring presentation of VOD content at a first subscriber site, obtaining server metering data from a VOD server, the server metering data including identification information for a plurality of subscriber sites to identify particular VOD content provided uniquely to each of the subscriber sites, the identification information manipulated to preserve anonymity of the plurality of subscriber sites, manipulating at least a portion of the subscriber metering data to determine a first manipulated identifier to identify the first subscriber site, and using the first manipulated identifier to cross-reference the manipulated identification informa-
(Continued)

tion included in the server metering data to merge the subscriber metering data and the portion of the server metering data uniquely associated with the first subscriber site.

20 Claims, 12 Drawing Sheets

Related U.S. Application Data continuation of application No. 12/769,163, filed on Apr. 28, 2010, now Pat. No. 8,381,241, which is a continuation of application No. 11/550,261, filed on Oct. 17, 2006, now abandoned, which is a continuation of application No. PCT/US2005/013765, filed on Apr. 22, 2005.

(60) Provisional application No. 60/564,777, filed on Apr. 23, 2004.

(51) Int. Cl.
| | | |
|---|---|---|
| *H04H 20/14* | (2008.01) | |
| *H04H 60/37* | (2008.01) | |
| *H04H 60/40* | (2008.01) | |
| *H04H 60/45* | (2008.01) | |
| *H04H 60/59* | (2008.01) | |
| *H04H 60/64* | (2008.01) | |
| *H04N 7/173* | (2011.01) | |
| *H04N 21/254* | (2011.01) | |
| *H04N 21/258* | (2011.01) | |
| *H04N 21/472* | (2011.01) | |
| *H04N 21/658* | (2011.01) | |
| *H04N 21/8352* | (2011.01) | |
| *H04H 60/43* | (2008.01) | |
| *H04H 60/58* | (2008.01) | |

(52) U.S. Cl.
CPC ............ *H04H 60/45* (2013.01); *H04H 60/59* (2013.01); *H04H 60/64* (2013.01); *H04N 7/173* (2013.01); *H04N 21/254* (2013.01); *H04N 21/25866* (2013.01); *H04N 21/44222* (2013.01); *H04N 21/47202* (2013.01); *H04N 21/6582* (2013.01); *H04N 21/8352* (2013.01); *H04H 60/43* (2013.01); *H04H 60/58* (2013.01); *H04H 2201/90* (2013.01)

(56) References Cited

U.S. PATENT DOCUMENTS

| | | | |
|---|---|---|---|
| 5,450,122 A | 9/1995 | Keene | |
| 5,481,294 A | 1/1996 | Thomas et al. | |
| 5,481,296 A | 1/1996 | Cragun et al. | |
| 5,485,518 A | 1/1996 | Hunter et al. | |
| 5,488,408 A | 1/1996 | Maduzia et al. | |
| 5,521,631 A | 5/1996 | Budow et al. | |
| 5,535,209 A | 7/1996 | Glaser et al. | |
| 5,539,822 A | 7/1996 | Lett | |
| 5,636,346 A | 6/1997 | Saxe | |
| 5,697,844 A | 12/1997 | Von Kohom | |
| 5,701,582 A | 12/1997 | DeBey | |
| 5,724,521 A | 3/1998 | Dedrick | |
| 5,734,720 A | 3/1998 | Salganicoff | |
| 5,758,257 A | 5/1998 | Herz et al. | |
| 5,872,588 A | 2/1999 | Aras et al. | |
| 5,892,826 A | 4/1999 | Brown et al. | |
| 5,956,716 A | 9/1999 | Kenner et al. | |
| 5,974,299 A | 10/1999 | Masetti | |
| 6,002,393 A | 12/1999 | Hite et al. | |
| 6,005,561 A | 12/1999 | Hawkins et al. | |
| 6,025,837 A | 2/2000 | Matthews, III et al. | |
| 6,061,451 A | 5/2000 | Muratani et al. | |
| 6,088,722 A | 7/2000 | Herz et al. | |
| 6,166,730 A | 12/2000 | Goode et al. | |
| 6,189,008 B1 | 2/2001 | Easty et al. | |
| 6,216,265 B1 | 4/2001 | Roop et al. | |
| 6,226,618 B1 | 5/2001 | Downs et al. | |
| 6,253,238 B1 | 6/2001 | Lauder et al. | |
| 6,289,514 B1 | 9/2001 | Link et al. | |
| 6,356,945 B1 | 3/2002 | Shaw et al. | |
| 6,490,587 B2 | 12/2002 | Easty et al. | |
| 6,748,427 B2 | 6/2004 | Drosset et al. | |
| 6,983,478 B1 * | 1/2006 | Grauch et al. | ............... 725/13 |
| 6,988,108 B2 | 1/2006 | Bernhardt et al. | |
| 7,080,136 B2 | 7/2006 | Duffield et al. | |
| 7,124,938 B1 | 10/2006 | Marsh | |
| 7,130,778 B1 | 10/2006 | Connell et al. | |
| 7,139,723 B2 | 11/2006 | Conkwright et al. | |
| 7,444,655 B2 | 10/2008 | Sardera | |
| 8,307,006 B2 | 11/2012 | Hannan et al. | |
| 8,381,241 B2 | 2/2013 | Ramaswamy et al. | |
| 8,707,340 B2 | 4/2014 | Ramaswamy et al. | |
| 8,903,864 B2 | 12/2014 | Hannan et al. | |
| 9,355,138 B2 | 5/2016 | Hannan et al. | |
| 2001/0023436 A1 | 9/2001 | Srinivasan et al. | |
| 2001/0034708 A1 | 10/2001 | Walker et al. | |
| 2001/0049620 A1 | 12/2001 | Blasko | |
| 2001/0051996 A1 | 12/2001 | Cooper et al. | |
| 2002/0010919 A1 | 1/2002 | Lu et al. | |
| 2002/0019769 A1 | 2/2002 | Barritz et al. | |
| 2002/0031224 A1 | 3/2002 | Basawapatna et al. | |
| 2002/0044225 A1 | 4/2002 | Rakib | |
| 2002/0053078 A1 | 5/2002 | Holtz et al. | |
| 2002/0056086 A1 | 5/2002 | Yuen | |
| 2002/0056087 A1 | 5/2002 | Berezowski et al. | |
| 2002/0059637 A1 | 5/2002 | Rakib | |
| 2002/0078441 A1 | 6/2002 | Drake et al. | |
| 2002/0110360 A1 | 8/2002 | Potrebic | |
| 2002/0112048 A1 | 8/2002 | Guyer et al. | |
| 2002/0120925 A1 | 8/2002 | Logan | |
| 2002/0129368 A1 | 9/2002 | Schlack et al. | |
| 2002/0191810 A1 | 12/2002 | Fudge et al. | |
| 2002/0194592 A1 | 12/2002 | Tsuchida et al. | |
| 2003/0001880 A1 | 1/2003 | Holtz et al. | |
| 2003/0005430 A1 | 1/2003 | Kolessar | |
| 2003/0037333 A1 | 2/2003 | Ghashghai et al. | |
| 2003/0041143 A1 | 2/2003 | Ronald et al. | |
| 2003/0149975 A1 | 8/2003 | Eldering et al. | |
| 2003/0149991 A1 | 8/2003 | Reidhead et al. | |
| 2003/0154128 A1 | 8/2003 | Liga et al. | |
| 2003/0208763 A1 | 11/2003 | McElhatten et al. | |
| 2003/0208767 A1 | 11/2003 | Williamson et al. | |
| 2004/0019900 A1 | 1/2004 | Knightbridge et al. | |
| 2004/0039914 A1 * | 2/2004 | Barr et al. | ............... 713/176 |
| 2005/0055316 A1 | 3/2005 | Williams | |
| 2005/0138674 A1 | 6/2005 | Howard et al. | |
| 2005/0267750 A1 | 12/2005 | Steuer et al. | |
| 2005/0278731 A1 | 12/2005 | Cameron et al. | |
| 2007/0157262 A1 | 7/2007 | Ramaswamy et al. | |
| 2007/0186228 A1 | 8/2007 | Ramaswamy et al. | |
| 2009/0070443 A1 | 3/2009 | Vanderhook et al. | |
| 2009/0282430 A1 | 11/2009 | Grupta et al. | |
| 2010/0211967 A1 | 8/2010 | Ramaswamy et al. | |
| 2011/0088052 A1 | 4/2011 | Ramaswamy et al. | |
| 2012/0005213 A1 | 1/2012 | Hannan et al. | |
| 2015/0081704 A1 | 3/2015 | Hannan et al. | |

FOREIGN PATENT DOCUMENTS

| | | |
|---|---|---|
| CN | 101673304 | 3/2010 |
| EP | 0817486 | 1/1998 |
| EP | 1166555 | 1/2002 |
| EP | 2402899 | 1/2012 |
| WO | 9628904 | 9/1996 |
| WO | 9637983 | 11/1996 |
| WO | 9831155 | 7/1998 |
| WO | 9959275 | 11/1999 |
| WO | 0033565 | 6/2000 |
| WO | 0033578 | 6/2000 |

(56) References Cited

FOREIGN PATENT DOCUMENTS

| WO | 0131497 | 5/2001 |
|---|---|---|
| WO | 0147257 | 6/2001 |
| WO | 0147273 | 6/2001 |
| WO | 0176248 | 10/2001 |
| WO | 03071737 | 8/2003 |
| WO | 2004051997 | 6/2004 |
| WO | 2005079501 | 9/2005 |
| WO | 2005107110 | 11/2005 |
| WO | 2006130658 | 12/2006 |

OTHER PUBLICATIONS

Canadian Intellectual Property Office, "Office Action," issued in connection with Canadian Patent Application No. 2,556,553, mailed on Jun. 15, 2010, 10 pages.
Canadian Intellectual Property Office, "Office Action," issued in connection with Canadian Patent Application No. 2,556,553, mailed on Jun. 27, 2011, 3 pages.
United States Patent and Trademark Office, "Notice of Allowance," issued in connection with U.S. Appl. No. 13/762,025, dated Nov. 27, 2013, 10 pages.
United States Patent and Trademark Office, "Non-Final Office Action," issued in connection with U.S. Appl. No. 12/970,710, dated Aug. 13, 2012, 24 pages.
United States Patent and Trademark Office, "Notice of Allowance," issued in connection with U.S. Appl. No. 12/827,865, dated Jul. 5, 2012, 8 pages.
Patent Cooperation Treaty, International Preliminary Report on Patentability for PCT/US2005/013765, Feb. 22, 2007, 5 pages.
Riphagen et al., "In Search of the Elusive User: Gathering Information on the Web Server Access," NCSA, Oct. 14, 1996, 14 pages.
Patent Cooperation Treaty, "International Search Report," issued by the International Searching Authority in connection with PCT application No. PCT/US2005/013765, mailed Jan. 26, 2007, 4 pages.
Patent Cooperation Treaty, "Written Opinion of the International Searching Authority," issued by the International Searching Authority in connection with counterpart PCT application No. PCT/US2005/013765, mailed Jan. 26, 2007, 3 pages.
United States Patent and Trademark Office, "Non-Final Office Action," issued in connection with U.S. Appl. No. 12/769,163, on Sep. 23, 2010, 16 pages.
United States Patent and Trademark Office, "Final Office Action," issued in connection with U.S. Appl. No. 12/769,163, on Apr. 5, 2011, 22 pages.
United States Patent and Trademark Office, "Non-Final Office Action," issued in connection with U.S. Appl. No. 11/550,261, on Apr. 16, 2009, 16 pages.
United States Patent and Trademark Office, "Non-Final Office Action", issued in connection with U.S. Appl. No. 13/649,794, dated Apr. 7, 2014 (8 pages).
United States Patent and Trademark Office, "Notice of Allowance", issued in connection with U.S. Appl. No. 13/649,794, dated Jul. 24, 2014 (5 pages).
United States Patent and Trademark Office, "Non-Final Office Action", issued in connection with U.S. Appl. No. 14/223,560, dated Oct. 8, 2014 (5 pages).
Patent Cooperation Treaty, "International Search Report," issued by the International Searching Authority in connection with PCT annlication No. PCT/US2005/005271, mailed Mar. 23, 2006 (1 page).
Patent Cooperation Treaty, "Written Opinion of the International Searching Authority," issued by the International Searching Authority in connection with counterpart PCT application No. PCT/US2005/005271, mailed Mar. 23, 2006 (3 pages).
Patent Cooperation Treaty, "International Preliminary Report on Patentability," issued by the International Bureau of WIPO in connection with counterpart PCT application No. PCT/US2005/005271, mailed Aug. 22, 2006 (4 pages).

United States Patent and Trademark Office, "Election/Restriction Requirement," issued in connection with U.S. Appl. No. 10/589,149, on Feb. 6, 2009 (7 pages).
United States Patent and Trademark Office, "Non-Final Office Action," issued in connection with U.S. Appl. No. 10/589,149, on Jun. 9, 2009 (27 pages).
United States Patent and Trademark Office, "Advisory Action," issued in connection with U.S. Appl. No. 10/589,149 on Mar. 12, 2010 (3 pages).
United States Patent and Trademark Office, "Notice of Allowance" issued in connection with corresponding U.S. Appl. No. 12/827,865 on Feb. 22, 2012 (9 pages).
EPO, "Extended European Search Report," issued in connection with EP Patent Application No11005351.9, on Oct. 7, 2011 (7 pages).
El Emam, Khaled, "Data Anonymizatlon Practices in Clinical Research," XP55008028, retrieved on Sep. 26, 2011 from <http://lwww.ehealthinformation.caldocumentslHealthCanadaAnonymizationReport.pdf>, dated May 8, 2006 (16 pages).
McCaa et al., ""IPUMS-International High Precision Population Census Microdata Samples: Balancing the Privacy—Quality Tradeoff by Means of Restricted Access Extracts, Privacy in Statistical Databases Lecture Notes in Computer Science (LNCS), vol. 4302, Springer-Verlag, 2006 (8 pages).
Samarati, Pierangela, "Protecting Respondents' Identities in Microdata Release," IEEE Transactions on Knowledge and Data Engineering, vol. 13, No. 6, Nov./Dec. 2001 (18 pages).
United States Patent and Trademark Office, "Non-Final Office Action," issued in connection with U.S Appl. No. 10/589,149, mailed on Jul. 19, 2010, (48 pages).
Canadian Intellectual Property Office, "Office Action," issued in connection with Canadian Patent Application No. 2,556,553, mailed on Jun. 15, 2010, (10 pages).
United States Patent and Trademark Office, "Non-Final Office Action," issued in connection with U.S. Appl. No. 11/550,261, mailed Feb. 24, 2009, 6 pages.
United States Patent and Trademark Office, "Non-Final Office Action," issued in connection with U.S. Appl. No. 11/550,261, mailed Apr. 16, 2009, 15 pages.
United States Patent and Trademark Office, "Final Office Action," issued in connection with U.S. Appl. No. 11/550,261, mailed Oct. 28, 2009, 22 pages.
Canadian Intellectual Property Office, "Office Action," issued in connection with Canadian Patent Application No. 2,556,553, dated Aug. 23, 2012, 3 pages.
United States Patent and Trademark Office, "Non-Final Office Action," issued in connection with U.S. Appl. No. 13/762,025, on Jul. 24, 2013, 5 pages.
The International Searching Authority, "International Search Report and Written Opinion of the International Searching Authority," issued in connection with International Patent Application Serial No. PCT/ US05/13765, mailed Jan. 26, 2007, completed Dec. 6, 2006, 9 pages.
International Bureau, "International Preliminary Report on Patentability," issued in connection with International Patent Application Serial No. PCT/US05/13765, issued Feb. 13, 2007, 5 pages.
United States Patent and Trademark Office, "Office communication," issued in connection with U.S. Appl. No. 10/589,149, mailed Jan. 6, 2010, 30 pages.
Canadian Intellectual Property Office, "Office Action," issued in connection with Canadian Application No. 2,556,553, dated Feb. 14, 2014, 2 pages.
Canadian Intellectual Property Office, "Office Action," issued in connection with Canadian Application No. 2,563,834, dated Jan. 7, 2014, 3 pages.
State Intellectual Property Office of China, "Notice of Decision of Granting Patent Right for Invention," issued in connection with Chinese Application No. 201110230823.X, dated Feb. 18, 2014, 5 pages.
Requisition by Examiner, issued by the Canadian Intellectual Property Office in connection with Canadian Patent Application No. 2563834, on Oct. 22, 2012, 3 pages.

(56) References Cited

OTHER PUBLICATIONS

First Office Action, issued by the State Intellectual Property Office of China P.R. in connection with Chinese Patent Application No. 201110230823.X, on Nov. 26, 2012, 13 pages.
Second Office Action, issued by the State Intellectual Property Office of China P.R. in connection with Chinese Patent Application No. 201110230823.X, on Aug. 6, 2013, 10 pages.
United States Patent and Trademark Office, "Non-Final Office Action", issued in connection with U.S. Appl. No. 14/553,334, dated Jun. 24, 2015 (6 pages).
Canadian Intellectual Property Office, "Office Action" issued in connection with Canadian Patent Application No. 2,563,834, dated Dec. 23, 2014 (4 pages).
United States Patent and Trademark Office, "Notice of Allowance", issued in connection with U.S. Appl. No. 14/553,334, dated Oct. 9, 2015 (5 pages).
United States Patent and Trademark Office, "Notice of Allowance", issued in connection with U.S. Appl. No. 14/553,334, dated Jan. 21, 2016 (7 pages).
Canadian Intellectual Propery Office, "Office Action", issued in connection with Canadian Patent Application No. 2,933,668, dated Aug. 29, 2016 (3 pages).

\* cited by examiner

METHODS AND APPARATUS TO MAINTAIN AUDIENCE PRIVACY WHILE DETERMINING VIEWING OF VIDEO-ON-DEMAND PROGRAMS

RELATED APPLICATIONS

This patent arises from a continuation of U.S. patent application Ser. No. 13/762,025 (now U.S. Pat. No. 8,707, 340), entitled "Methods and Apparatus to Maintain Audience Privacy while Determining Viewing of Video-on-Demand Programs" and filed on Feb. 7, 2013, which is a continuation of U.S. patent application Ser. No. 12/769,163 (now U.S. Pat. No. 8,381,241), entitled "Methods and Apparatus to Maintain Audience Privacy while Determining Viewing of Video-on-Demand Programs" and filed on Apr. 28, 2010, which is a continuation of U.S. patent application Ser. No. 11/550,261, entitled "Methods and Apparatus to Maintain Audience Privacy while Determining Viewing of Video-on-Demand Programs" and filed on Oct. 17, 2006, which is a continuation of International Application Serial Number PCT/US05/013765, entitled "Methods and Apparatus to Maintain Audience Privacy while Determining Viewing of Video-on-Demand Programs," which claims priority from U.S. Provisional Application Ser. No. 60/564, 777, entitled "Methods and Apparatus to Maintain Audience Privacy While Determining Viewing of Video-on-Demand Programs" and filed on Apr. 23, 2004. U.S. patent application Ser. Nos. 11/550,261 and 12/769,163, International Application Serial Number PCT/US05/013765 and U.S. Provisional Application Ser. No. 60/564,777 are hereby incorporated by reference in their respective entireties.

FIELD OF THE DISCLOSURE

This disclosure relates generally to audience measurement and, more particularly, to methods and apparatus to maintain audience privacy while determining viewing of video-on-demand programs.

BACKGROUND

Television ratings and metering information is typically generated by collecting viewing records and/or other viewing information from a group of statistically selected households. Each of the statistically selected households typically has a data logging and processing unit commonly referred to as a "home unit." In households having multiple viewing sites (e.g., multiple television systems), the data logging and processing functionality may be distributed among a single home unit and multiple "site units," one site unit for each viewing site. The home unit (or the combination of the home unit and the site unit) is often in communication with a variety of attachments that provide inputs to the home unit or receive outputs from the home unit. For example, a source identification unit such as a frequency detector attachment may be in communication with a television to sense a local oscillator frequency of the television tuner. In this manner, the frequency detector attachment may be used to determine the channel to which the television is currently tuned based on a detected frequency. Additional source identification devices, such as on-screen readers and light-emitting-diode (LED) display readers, may be provided, for example, to determine if the television is operating (i.e., is turned ON) and/or the channel to which the television is tuned. A people counter may be located in the viewing space of the television and in communication with the home unit, thereby enabling the home unit to detect the identities and/or number of the persons currently viewing programs displayed on the television.

The home unit usually processes the inputs (e.g., channel tuning information, viewer identities, etc.) from the attachments to produce viewing records. Viewing records may be generated on a periodic basis (e.g., at fixed time intervals) or may be generated in response to one or more predetermined events, such as a full memory, or a change in an input, such as a change in the identities of the persons viewing the television, a change in the channel tuning information (i.e., a channel change), etc. Each viewing record typically contains channel information, such as a channel number and/or station identification (ID), and a time (e.g., a date and time-of-day) at which the channel was displayed. In cases in which the program content being displayed is associated with a local audio/video content delivery device, such as a digital video disk (DVD) player, a digital video recorder (DVR), a video cassette recorder (VCR), etc., the viewing records may include content identification (i.e., program identification) information as well as information relating to the time and manner in which the associated content was displayed. Viewing records may also contain additional information, such as the number of viewers present at the viewing time.

The home unit typically collects a quantity of viewing records and periodically (e.g., daily) transmits the collected viewing records to a central office or data processing facility for further processing or analysis. The central data processing facility receives viewing records from home units located in some or all of the statistically selected households and analyzes the viewing records to ascertain the viewing behaviors of households in a geographic area or market of interest, a particular household and/or a particular group of households selected from all participating households. Additionally, the central data processing facility may generate metering statistics and other parameters indicative of viewing behavior associated with some or all of the participating households. This data may be extrapolated to reflect the viewing behaviors of markets and/or regions modeled by the statistically selected households.

To generate viewing behavior information from viewing records, the central office or data processing facility may compare reference data, such as a list of programs (e.g., a schedule of television programming or a television guide), to the viewing records. In this manner, the central office can infer which program was displayed by cross-referencing the time and channel information in a viewing record to the program associated with that same time and channel in the program schedule. Such a cross-referencing process can be carried out for each of the viewing records received by the central office, thereby enabling the central office to reconstruct which programs were displayed by the selected households and the times at which the programs were displayed. Of course, the aforementioned cross-referencing process is unnecessary in systems in which the identity of the program is obtained by the home unit and contained in the viewing record.

The rapid development and deployment of a wide variety of audio/video content delivery and distribution platforms has dramatically complicated the home unit task of providing viewing records or information to the central data collection facility. For instance, while the above-mentioned frequency detector device can be used to detect channel information at a site where network television broadcasts are being displayed (because, under normal operation conditions, the local oscillator frequency corresponds to a known network channel), such a device typically cannot be used with digital broadcast systems. In particular, digital broadcast systems (e.g., satellite-based digital television systems, digital cable systems, etc.) typically include a digital receiver or set-top box at each subscriber site. The digital receiver or set-top box demodulates a multi-program data stream, parses the multi-program data stream into individual audio and/or video data packets, and selectively processes those data packets to generate an audio/video signal for a desired program. The audio and/or video output signals generated by the set-top box can be directly coupled to an audio/video input of an output device (e.g., a television, a video monitor, etc.) As a result, the local oscillator frequency of the output device tuner, if any, does not necessarily identify the channel or program currently being displayed.

To allow generation of meaningful viewing records in cases wherein, for example, the network channel is not readily identifiable or may not uniquely correspond to a displayed program, metering techniques based on the use of ancillary codes and/or content signatures may be employed. Metering techniques that rely on ancillary codes often encode and embed identifying information (e.g., a broadcast/network channel number, a program identification code, a broadcast time stamp, a source identifier to identify a network and/or station providing and/or broadcasting the content, etc.) in the broadcast signal such that the code is not noticed by the viewer. For example, a well-known technique used in television broadcasting involves embedding the ancillary codes in the non-viewable vertical blanking interval of the video signal. Another example involves embedding the ancillary codes in non-audible portions of the audio signal accompanying the broadcast program. This latter technique is especially advantageous because the ancillary code may be reproduced by, for example, the television speaker and non-intrusively monitored by an external sensor, such as a microphone.

In general, signature-based program identification techniques use one or more characteristics of the currently displayed (but not yet identified) audio/video content to generate a substantially unique proxy or signature (e.g., a series of digital values, a waveform, etc.) for that content. The signature information for the content being displayed may be compared to a set of reference signatures corresponding to a known set of programs. When a substantial match is found, the currently displayed program content can be identified with a relatively high probability.

While the known apparatus and techniques described above are well-suited for generating viewing records associated with live viewing of broadcast television programming, they may not be directly applicable to the generation of viewing records associated with video-on-demand (VOD) programs. In a VOD system, a subscriber may select among a potentially large collection of programming content to be transmitted to the specific subscriber's home for immediate viewing or for viewing at a later time. Thus, existing metering techniques based on cross-referencing a predetermined broadcast programming guide or television listing are not applicable because the content to be transmitted to the subscriber's home is not known prior to when the subscriber makes the selection. Thus, existing techniques would require a computationally expensive brute-force search over all possible reference broadcast and VOD content to determine the specific VOD content being consumed at the subscriber's home (because existing metering techniques typically do not distinguish whether the source of the consumed programming content is a broadcast or a VOD source). Moreover, the existing metering techniques may not be able to distinguish between content that may be provided by both a broadcast provider and a VOD provider and, as such, may incorrectly credit the source of the consumed programming content.

DETAILED DESCRIPTION

Figure 1:
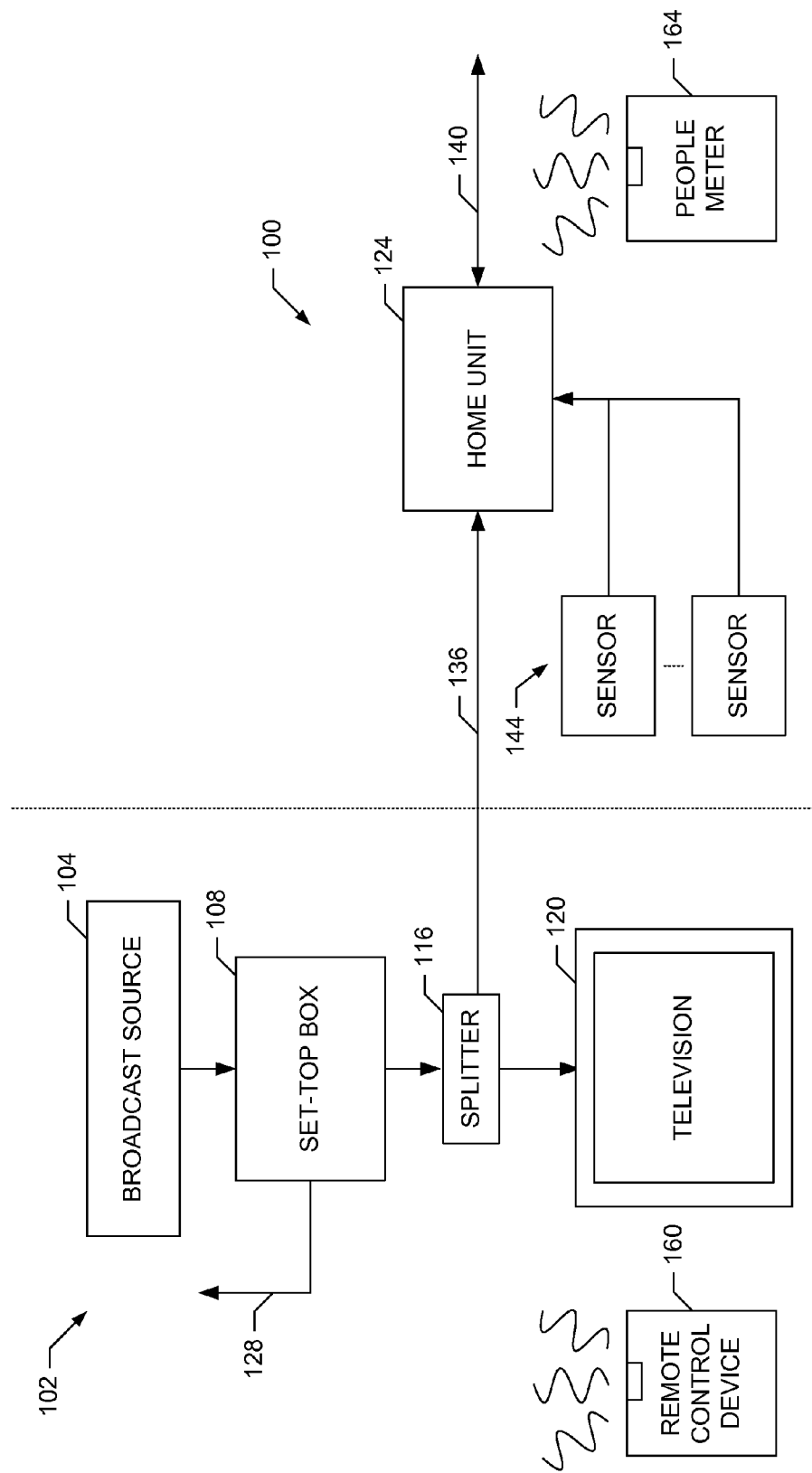
FIG. 1 is a block diagram of an example local metering system coupled to an example home entertainment system.

A block diagram of an example local metering system 100 capable of providing viewing and metering information for video-on-demand program content via an example home entertainment system 102 is illustrated in FIG. 1. The example home entertainment system 102 includes a broadcast source 104, a set-top box (STB) 108, a signal splitter 116 and a television 120. The example local metering system 100 includes a home unit 124. The components of the home entertainment system 102 and the local metering system 100 may be connected in any well-known manner including that shown in FIG. 1. For example, in a statistically selected household having one or more home entertainment systems 102, the home unit 124 may be implemented as a single home unit and one or more site units. In such a configuration, the single home unit performs the functions of storing data and forwarding the stored data to a central facility (such as the central facility 211 of FIG. 2 discussed below) for subsequent processing. Each site unit is coupled to a corresponding home entertainment system 102 and performs the functions of collecting viewing/metering data, processing such data (possibly in real-time) and sending the processed data to the single home unit for that home. The home unit receives and stores the data collected by the site units and subsequently forwards that collected data to the central facility.

The broadcast source 104 may be any broadcast media source, such as a cable television service provider, a satellite television service provider, a radio frequency (RF) television service provider, an internet streaming video/audio provider, etc. The broadcast source 104 may provide analog and/or digital television signals to the home entertainment system 102, for example, over a coaxial cable or via a wireless connection.

The STB 108 may be any set-top box, such as a cable television converter, a direct broadcast satellite (DBS) decoder, a video cassette recorder (VCR), etc. The set-top box 108 receives a plurality of broadcast channels from the broadcast source 104. Typically, the STB 108 selects one of the plurality of broadcast channels based on a user input, and outputs one or more signals received via the selected broadcast channel. In the case of an analog signal, the STB 108 tunes to a particular channel to obtain programming delivered on that channel. For a digital signal, the STB 108 may tune to a channel and decode certain packets of data to obtain programming delivered on a selected channel. For example, the STB 108 may tune to a major channel and then extract a program carried on a minor channel within the major channel via the decoding process mentioned above. For some home entertainment systems 102, for example, those in which the broadcast source 104 is a standard RF analog television service provider or a basic analog cable television service provider, the STB 108 may not be present as its function is performed by a tuner in the television 120.

An output from the STB 108 is fed to a signal splitter 116, such as a single analog y-splitter in the case of an RF coaxial connection between the STB 108 and the television 120 or an audio/video splitter in the case of a direct audio/video connection between the STB 108 and the television 120. (For configurations in which the STB 108 is not present, the broadcast source 104 may be coupled directly to the signal splitter 116). In the example home entertainment system 102, the signal splitter produces two signals indicative of the output from the STB 108. Of course, a person of ordinary skill in the art will readily appreciate that any number of signals may be produced by the signal splitter 116.

The STB 108 may also be coupled to a back-channel connection 128 to provide a return communication path to the broadcast signal provider corresponding to the broadcast source 104. The STB 108 may use the back-channel connection 128 to send billing and/or status information to the broadcast provider. The back-channel connection 128 may also allow a subscriber to use the STB 108 to request/order content for viewing on the television 120 (e.g., pay-per-view movies, video-on-demand programming, etc.), purchase goods and/or services, modify the subscription package associated with the STB 108, etc.

In the illustrated example, one of the two signals from the signal splitter 116 is fed to the television 120 and the other signal is delivered to the home unit 124. The television 120 may be any type of television or television display device. For example, the television 120 may be a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, or may be a multimedia computer system, etc.

The second of the two signals from the signal splitter 116 (i.e., the signal carried by connection 136 in FIG. 1) is coupled to an input of the home unit 124. The home unit 124 is a data logging and processing unit that may be used to generate viewing records and other viewing information useful for determining viewing and other metering information. The home unit 124 typically collects a set of viewing records and transmits the collected viewing records over a connection 140 to a central office or data processing facility (not shown) for further processing or analysis. The connection 140 may be a telephone line, a return cable television connection, an RF or satellite connection, an internet connection or the like.

The home unit 124 may be configured to determine identifying information based on the signal corresponding to the program content being output by the STB 108. For example, the home unit 124 may be configured to decode an embedded ancillary code in the signal received via connection 136 that corresponds to the program currently being delivered by the STB 108 for display on the television 120. Alternatively or additionally, the home unit 124 may be configured to generate a program signature based on the signal received via connection 136 that corresponds to the program currently being delivered by the STB 108 for display on the television 120. The home unit may then add this program identifying information to the viewing records corresponding to the currently displayed program.

To facilitate the determination of program identifying information and the generation of viewing records for the currently displayed program content, the home unit 124 may also be provided with one or more sensors 144. For example, one of the sensors 144 may be a microphone placed in the proximity of the television 120 to receive audio signals corresponding to the program being displayed. The home unit 124 may then process the audio signals received from the microphone 144 to decode any embedded ancillary code(s) and/or generate one or more audio signatures corresponding to a program being displayed. Another of the sensors 144 may be an on-screen display detector for capturing images displayed on the television 120 and processing regions of interest in the displayed image. The regions of interest may correspond, for example, to a broadcast channel associated with the currently displayed program, a broadcast time associated with the currently displayed program, a viewing time associated with the currently displayed program, etc. Example on-screen display detectors are disclosed by Nelson, et al. in U.S. Provisional Patent Application Ser. No. 60/523,444 filed on Nov. 19, 2003, and International Patent Application Serial No. PCT/US04/12272 filed on Apr. 19, 2004, both of which are hereby incorporated by reference. Yet another of the sensors 144 could be a frequency detector to determine, for example, the channel to which the television 120 is tuned. One having ordinary skill in the art will recognize that there are a variety of sensors 144 that may be coupled with the home unit 124 to facilitate generation of viewing records containing sufficient information for the central office to determine a set of desired ratings and/or metering results.

The example home entertainment system 102 also includes a remote control device 160 to transmit control information that may be received by any or all of the STB 108, the television 120 and the home unit 124. One having ordinary skill in the art will recognize that the remote control device 160 may transmit this information using a variety of techniques, including, but not limited to, infrared (IR) transmission, radio frequency transmission, wired/cabled connection, and the like.

The example local metering system 100 also includes a people meter 164 to capture information about the audience. The example people meter 164 may have a set of input keys, each assigned to represent a single viewer, and may prompt the audience members to indicate that they are present in the viewing audience by pressing the appropriate input key. The people meter 164 may also receive information from the home unit 124 to determine a time at which to prompt the audience members. Moreover, the home unit 124 may receive information from the people meter 164 to modify an operation of the home unit 124 (such as causing the home unit to generate one or more viewing records based on a change in the viewing audience). As will be appreciated by one having ordinary skill in the art, the people meter 164 may receive and/or transmit information using a variety of techniques, including, but not limited to, infrared (IR) transmission, radio frequency transmission, wired/cabled connection, and the like. As will also be appreciated by one having ordinary skill in the art, the people meter 164 may be implemented by a combination of the remote control device 160 and one or more of the STB 108 and/or the home unit 124. In such an implementation, the STB 108 and/or the home unit 124 may be configured to display prompting information and/or other appropriate people meter content directly on the television 120. Correspondingly, the remote control device 160 may be configured to accept inputs from the viewing audience and transmit these user inputs to the appropriate device responsible for generating the people meter display on the television 120.

Figure 2:
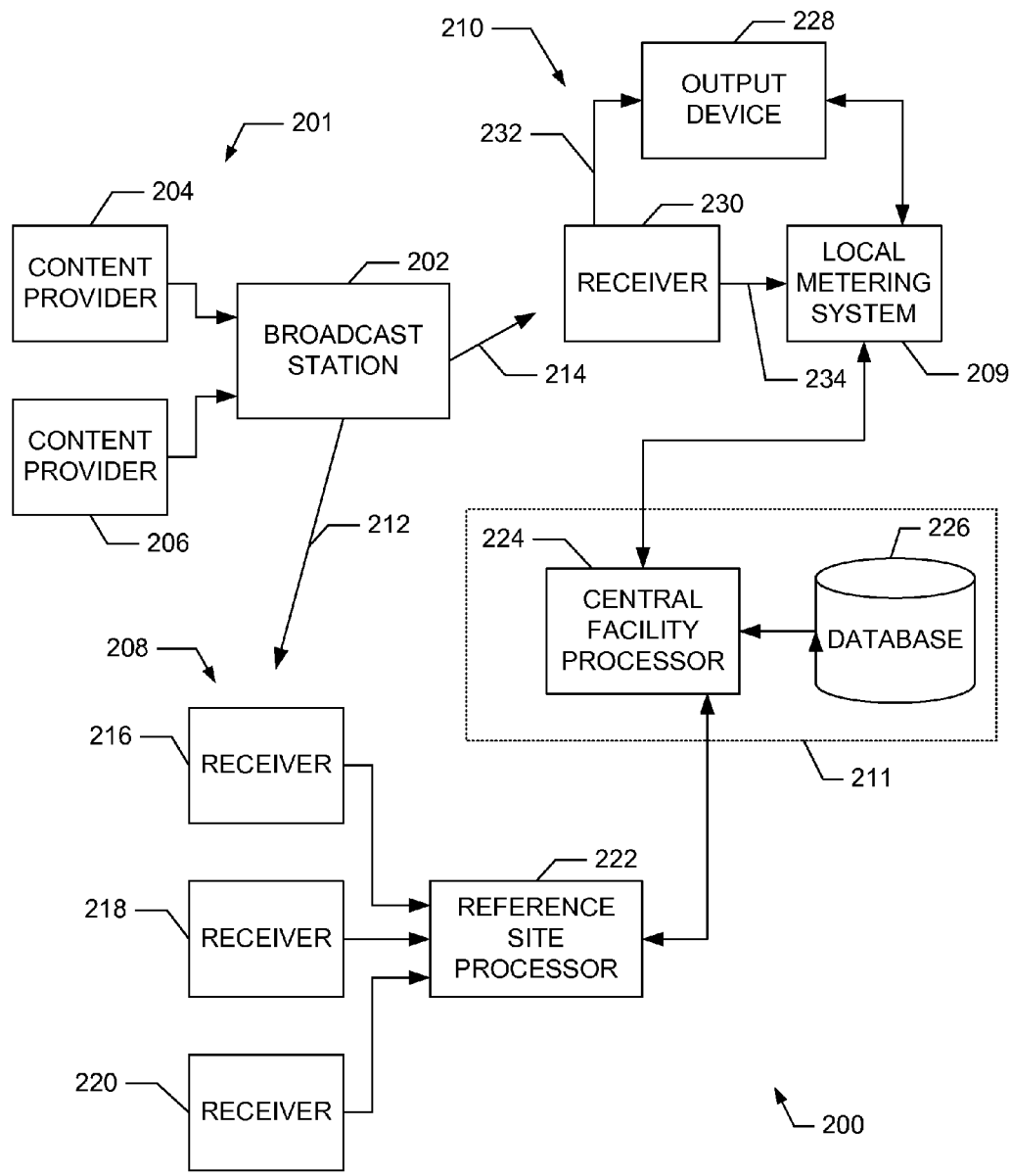
FIG. 2 is a block diagram of an example broadcast system and an example monitoring system.

FIG. 2 illustrates an example monitoring system 200 to monitor viewing of program content provided by an example broadcast system 201. The example broadcast system 201 of FIG. 2 includes a broadcast station 202 that receives audio/video content from a plurality of content providers 204 and 206. The audio/video content providers 204 and 206 may provide audio and/or video programs or information, such as television programs, advertisements, audio (e.g., radio) programs, still image information (e.g., web pages), etc., in known manners to the broadcast station 202.

The example monitoring system 200 of FIG. 2 includes one or more reference sites 208, a plurality of local metering systems 209 (for example, a set of systems similar or identical to the local metering system 100 of FIG. 1) located at a plurality of home sites 210 (which may be statistically selected to represent a larger population) and a central facility 211 to compile and process data collected by the local metering systems 209. For ease of reference, only one home site 210, one reference site 208 and one central facility 211 is shown in FIG. 2. However, persons of ordinary skill in the art will appreciate that any number of home sites 210, reference sites 208 and/or central data collection and processing facilities 211 may be employed.

The broadcast station 202 transmits one or more signals containing digital and/or analog audio/video content information. These signals are received by at least one reference site 208 and at least one statistically selected home site 210 via communication paths or links 212 and 214, respectively. The communication paths or links 212 and 214 may include any combination of hardwired or wireless links, such as satellite links, wireless land-based links, cable links, etc. The signals conveyed via the links 212 and 214 may contain multi-program analog signals and/or digital data streams which are commonly employed within existing broadcast systems.

In the example monitoring system 200, the reference site 208 includes a plurality of receivers (e.g., set-top boxes or the like) 216, 218 and 220 that simultaneously demodulate, demultiplex and/or decode audio, video and/or other information received from the broadcast station 202. In the illustrated example, each of the receivers 216, 218 and 220 provides audio and/or video information associated with a different program that is currently being broadcast to a reference site processor 222. In other words, the receiver 216 may provide audio and/or video information associated with a program A while the receivers 218 and 220 provide audio and/or video information associated with respective programs B and C. In addition, the reference site processor 222 is configured to control each of the receivers 216, 218 and 220 and/or has information indicating a program to which each of the receivers 216, 218 and 220 is tuned at any given time.

The reference site processor 222 may determine the original broadcast date/time stamps, decode reference ancillary code information and/or generate reference signature information for a plurality of simultaneously broadcast audio/video content. The reference site processor 222 sends the original broadcast time stamps and the reference code and/or signature information to a central facility processor 224 which stores the original broadcast time stamps and the reference code and/or signature information in a database 226.

The home site 210 could be, for example, a statistically selected home containing a television, a radio, a computer, etc. The home site 210 includes an output device 228 (e.g., a video display, speaker, etc., such as the television 120 of FIG. 1). The home site 210 also includes a receiver 230, such as the STB 108 of FIG. 1, which may be similar or identical to the receivers 216, 218 and 220. Such receivers are well-known and, thus, are not described in greater detail herein. The receiver 230 provides audio and/or video signals 232 to the output device 228 that are used to present the program currently selected for consumption.

To monitor the use of the receiver 230, the home site 210 is provided with a local metering system 209, such as the local metering system 100 of FIG. 1. The local metering system 209 may include, for example, a home unit such as the home unit 124. The receiver 230 provides an audio and/or a video signal containing audio and/or video information associated with the currently displayed program to the local metering system 209 via a connection 234. The local metering system 209 uses the signal received via the connection 234 to decode ancillary code information and/or generate signature information corresponding to the program currently being displayed on the output device 228. The local metering system 209 stores and periodically conveys this code and/or signature information to the central facility processor 224, for example, in the form of a viewing record or set of records.

The central facility processor 224, in addition to being able to perform other processing tasks, is configured to compare code and/or signature information generated at the home site 210 to the reference code and/or signature information stored in the database 226 to identify the channels and/or programs that were displayed at the home site 210. To facilitate the comparison of code and/or signature information received from the reference site 208 to the code and/or signature information received from the home site 210, the reference site processor 222 and the local metering system 209 may generate time stamp information and associate such time stamp information with the code and/or signature information collected at the corresponding time. In this manner, the central facility processor 224 can attempt to align the code and/or signature information received from the reference sites 208 with the code and/or signature information collected at the corresponding times via the home site 210 to thereby reduce the number of comparisons required to identify a match.

Figure 3:
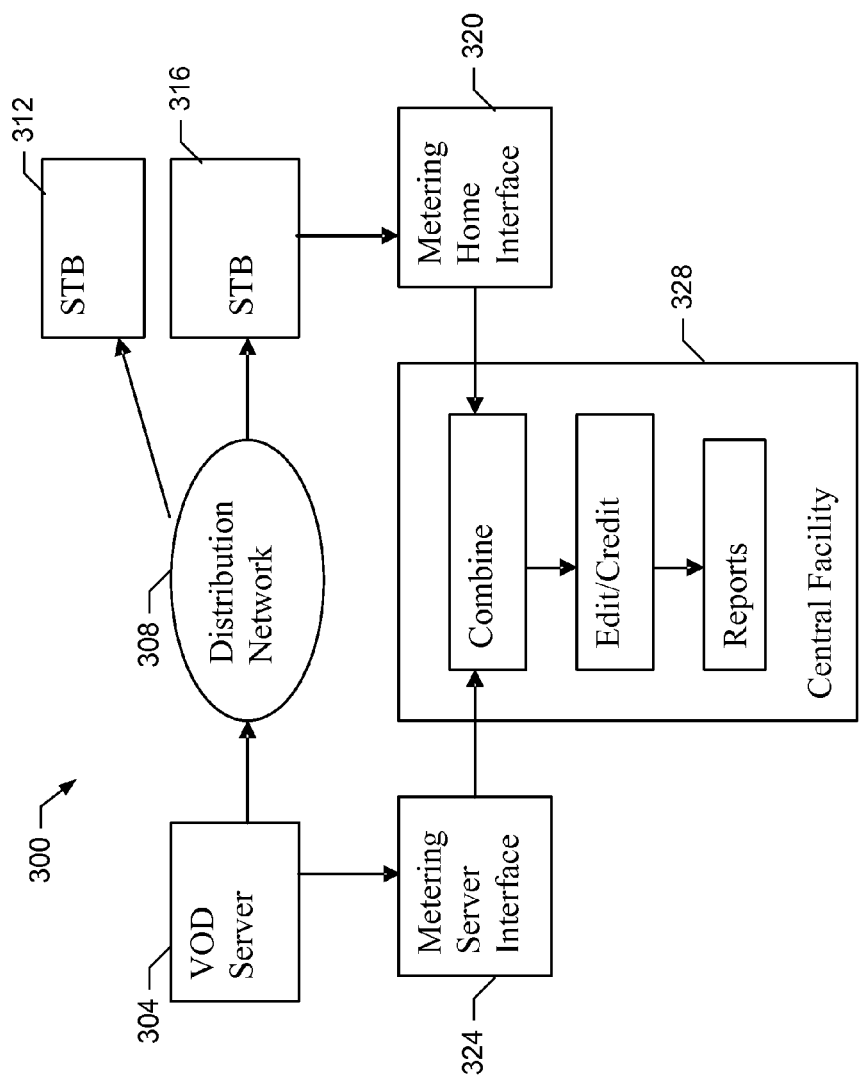
FIG. 3 is a block diagram of an example monitoring system for video-on-demand (VOD) programming that may employ metered data from a VOD server and/or a statistically selected home.

FIG. 3 illustrates an example monitoring system for video-on-demand (VOD) programming that may employ metered data from a VOD server and/or a statistically selected home. In the example environment of use of FIG. 3, the VOD system includes a VOD server 304, a distribution network 308 and multiple subscriber STBs 312, 316. The VOD server 304 may be implemented as a single server or a collection of servers located in a central location or multiple, distributed geographical locations. The VOD server 304 stores the VOD content to be transmitted to the subscriber STBs 312, 316. The distribution network 308 may be any distribution network that is able to transmit VOD content to a subscriber location (e.g., an RF television broadcaster, a cable television service provider, a satellite service provider, etc.). For example, the distribution network 308 may be implemented by the broadcast station 202 and the communication paths 212 and 214 of FIG. 2. The subscriber STBs 312, 316 may be any set-top box, such as the STB 108 of FIG. 1.

The example monitoring system of FIG. 3 includes a metering home interface 320, such as the local metering system 100 of FIG. 1, coupled to the STB 316. The metering home interface 320 may be used to collect viewing data (e.g., TV ON/OFF data, tuning data, content codes, content signatures, etc.), audience demographics (e.g., via the people meter 164), etc. The example monitoring system also includes a metering server interface 324 to collect data from the VOD server 304. The data may be stored in any appropriate format, for example, an XML format or equivalent, and may include VOD content information, such as the VOD content title, the associated metadata for the VOD content and other subscriber information, such as an STB identifier (ID) for a given subscriber's STB. The metered server data may correspond to all VOD service subscribers, instead of being limited to only those subscribers included in a statistical sampling of selected households.

The example monitoring system of FIG. 3 also includes a central facility 328, such as the central facility 211 of FIG. 2. The central facility 328 may receive information from the metering server interface 324 and/or the metering home interface 320. The central facility 328 may combine the information received from both the metering server interface 324 and/or the metering home interface 320 to credit VOD programming and to generate corresponding usage and demographic reports. For example, the central facility 328 may use the STB ID for the STB 316 to match the data from metering home interface 320 to the corresponding data received from the metering server interface 324.

Figure 4:
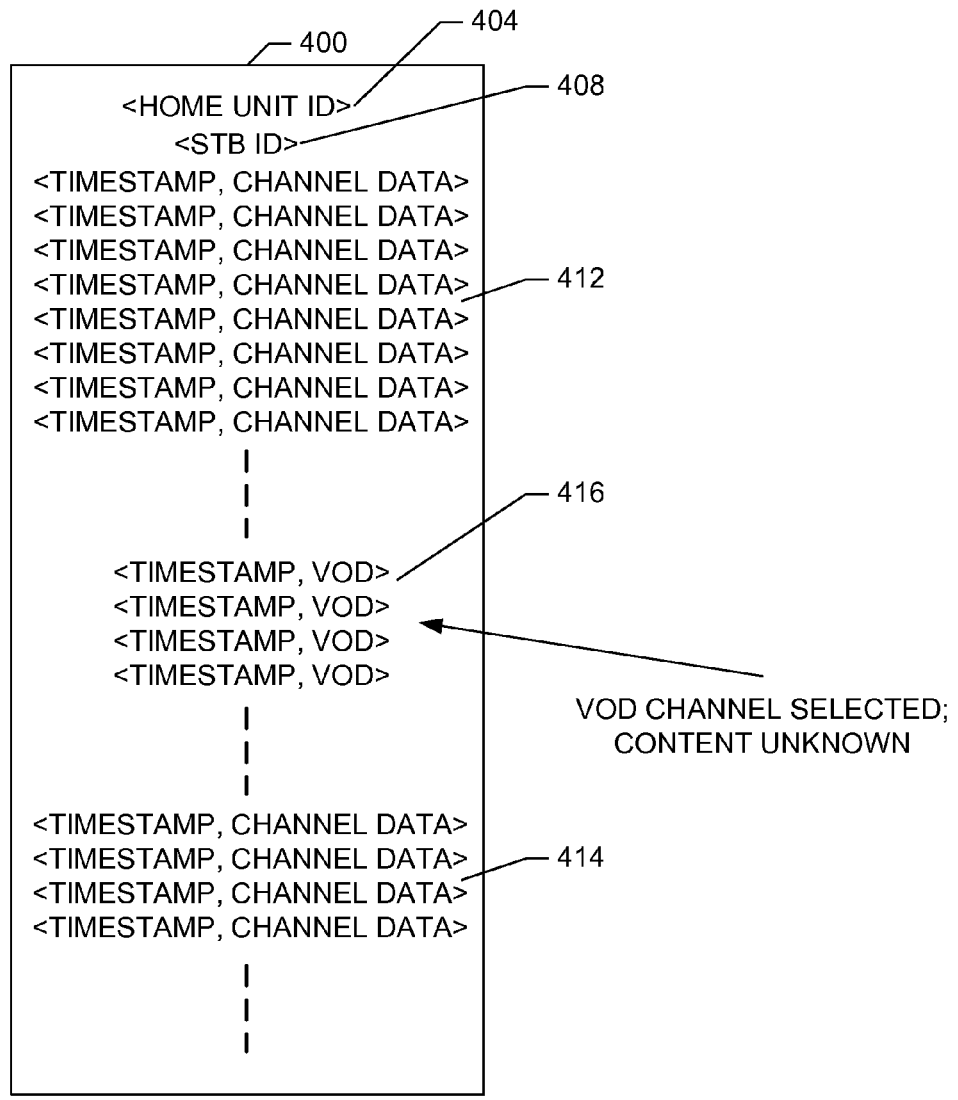
FIG. 4 illustrates an example viewing record generated by the local metering system of FIG. 1.

To better understand the benefits of collecting metering data from a VOD metering server interface (e.g., the metering server interface 324 of FIG. 3), an example viewing record 400 generated by a local metering system, (e.g., the local metering system 100 of FIG. 1 or the metering home interface 320 of FIG. 3) is shown in FIG. 4. The viewing record is typically generated by a home unit, such as the home unit 124 of FIG. 1, and reported to a central facility, such as the central facility 328 of FIG. 3. The home unit 124 may send the stored viewing records to the central facility 328, for example, at periodic intervals (e.g., once a day), continuously, or at a-periodic intervals (e.g., whenever a predetermined event occurs). One having ordinary skill in the art will appreciate that a variety of viewing records substantially equivalent to the viewing record 400 may be generated by the home unit 124. Such viewing records may include metering information in addition to and/or different from the example 400 of FIG. 4, yet may still be used by the methods and/or apparatus described herein.

Turning to FIG. 4, the example viewing record 400 includes a home unit ID 404 to identify the home unit 124 that generated/reported the viewing record. The viewing record 400 may also include a STB ID 408 corresponding to the STB, such as the STB 316, that selected and/or presented the displayed broadcast or VOD programming content. The home unit ID 404 and/or the STB ID 408 may be used by the central facility 328 to cross-reference the reported viewing record 400 with the corresponding VOD server data provided by the metering server interface 324.

The example viewing record also includes sets of channel data information 412, 414, 416 corresponding to channels of the STB 316 selected by the user/subscriber. In the instant example, the home unit 124 is configured to poll the STB 316 at periodic intervals (e.g., once every 2.7 sec.) to determine the channel number selected by the STB 316. Additionally, the home unit 124 may be configured with a mapping table, for example, to map sets of channels into larger supersets of channels having similar content. For example, a set of broadcast channels used to carry pay-per-view programming may be grouped into a single superset representing all receivable pay-per-view content. Similarly, a set of broadcast channels used to carry VOD programming may be grouped and represented by a single superset used to indicate that VOD content was selected/output by the STB 316. As a result, the channel data 412, 414 that the home unit 124 includes in the example viewing record 400 may comprise the channel number selected by the STB 316 and the timestamp at which the measurement was taken. Additionally or alternatively, the home unit 124 may include VOD data 416 in the example viewing record 400, with the VOD data 416 including an entry indicating that any member of the superset of VOD channels was selected (represented by "VOD" in FIG. 4) and the timestamp at which the measurement was taken. Thus, as one having ordinary skill in the art will recognize, the example viewing record 400 may be used to indicate that at least one of a superset of VOD channels was selected by the STB 316. However, the actual VOD channel selected and/or the actual VOD content selected/output by the STB 316 cannot be readily determined solely from the data included in the example viewing record 400.

Figure 5:
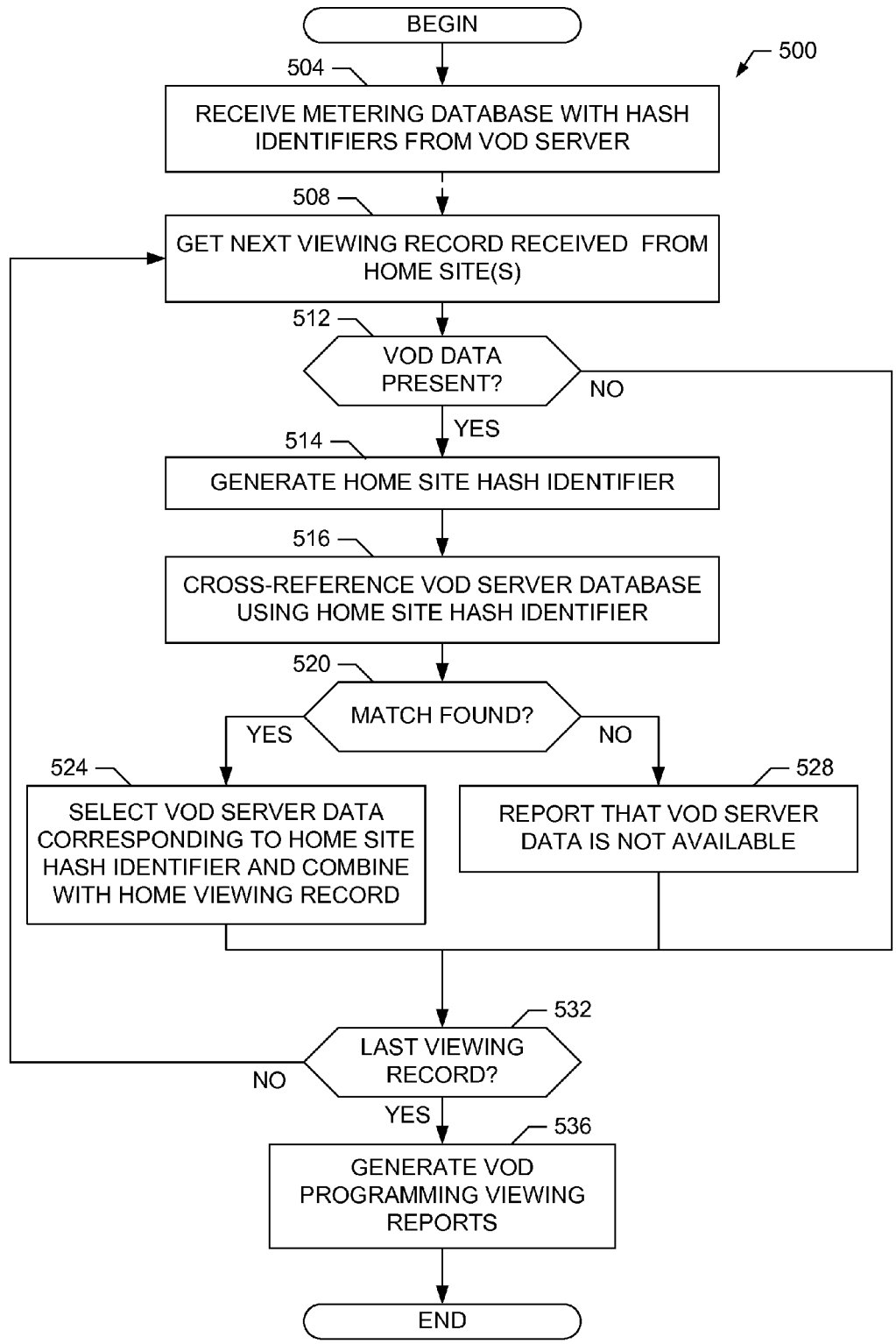
FIG. 5 is a flowchart of an example process to monitor VOD programming that may employ metered data from a VOD server and a statistically selected home.

To determine the actual selected/displayed VOD content corresponding to a reported viewing record, such as the example viewing record 400 of FIG. 4, an example process 500 to maintain subscriber privacy while combining metering data from a VOD server with metering data reported from one or more statistically selected homes is illustrated in the flowchart of FIG. 5. Examples of the types of metering data which may be provided by a VOD server are described in U.S. Patent Application Serial No. PCT/US05/05271, which is hereby incorporated by reference in its entirety. Using FIG. 3 as a reference, to perform the example process 500, a VOD metering server interface, such as the metering server interface 324, is configured to send a database of metering data for all households served by a VOD server, such as the VOD server 304, to a central facility, such as the central facility 328. Additionally or alternatively, the metering server interface 324 may be configured to send the database (or portions thereof) to a neutral third party site. In either case, such a VOD server metering database may be constructed to maintain the privacy of all VOD service subscribers by, for example, encrypting any subscriber identification information contained in the database. For example, a cryptographic hash function may be used to convert each subscriber's name, address and STB ID to a unique hash identifier for a given subscriber.

A cryptographic hash function takes as input a variable-size bit string/message (not exceeding a maximum size for the particular hash function) and outputs a fixed-size output bit string, also known as a message digest. As defined in the art, a good hash function is one in which the transformation is easy to compute, one-way (i.e., given the output bit string it is not possible, or at least not practical, to construct the original input string) and collision-free (i.e., given any two input bit strings it is not possible, or at least not probable, that both bit strings will produce the same output bit string). By replacing the original subscriber identification information with a hash identifier, it is possible to uniquely associate a subscriber's VOD metering data with a particular subscriber without revealing the identity of the subscriber.

A user of a VOD server hashed database (i.e., a database containing subscriber hash identifiers in lieu of cleartext subscriber identification information) may reconstruct the unique hash identifier for a subscriber for which the user already knows the particular subscriber's personal information (e.g., as in the case of a known, statistically-selected metering household). However, due to the one-way and collision-free properties of the hash function, the database user is not able to determine or decrypt the personal information corresponding to the hash identifier of a subscriber who is unknown to the user. Thus, the privacy of subscribers not belonging to, for example, the statistically selected metering households is maintained. One having ordinary skill in the art will appreciate that any well-known cryptographic hash function may be employed, such as the MD-2, MD-4 and MD-5 message digest algorithms available as Internet RFCs 1319, 1320 and 1321, respectively, the Secure Hash Standard (SHS) family of algorithms defined by the National Institute of Standards and Technology (NIST), etc.

After receiving the VOD-server hashed database, the central facility 328 stores the data in this database and then cross-references such data based on, for example, a unique hash identifier derived from home site personal information provided in and/or associated with the example viewing record 400. The central facility 328 may then augment the VOD data reported in the viewing record 400 with the corresponding, specific VOD content information included in the VOD server metering database provided by the metering server interface 324.

Turning to FIG. 5, the example process 500 begins at block 504 at which the metering server interface 324 sends the hashed metering database for all households served by the VOD server 304 to the central facility 328 (and/or a neutral third-party site accessible by the central facility 328). The metering server interface 324 may be configured to send this hashed database at predetermined times, for example, at periodic (e.g., daily) intervals. Alternatively, the metering server interface 324 may send the database upon the occurrence of one or more predetermined events (e.g., in response to a request from the central facility 328, when a predetermined amount of data is collected, etc.). At some time or times after processing at block 504 completes, control proceeds to block 508 at which the central facility 328 gets one or more viewing records (such as the example viewing record 400 of FIG. 4) received from at least one metering home interface 320 (e.g., records generated and reported by a home unit, such as home unit 124, included in the metering home interface 320). Then at block 512, the central facility 328 determines whether VOD data (e.g., VOD data 416) is included in the reported viewing record 400. If VOD data is not present (block 512), control proceeds to block 532.

If VOD data 416 is present in the received viewing record 400 (block 512), control proceeds to block 514 at which the central facility 328 generates a unique hash identifier (hash ID) for the home site corresponding to the reported viewing record 400 using the same hash function employed by the VOD server 304 and/or the metering server interface 324 to create the VOD server hashed database. The central facility 328 may generate the unique hash ID based on personal information included in the viewing record 400 (e.g., a STB ID 408), personal information stored in another local database and referenced by data included in the viewing record 400 (e.g., name, address and STB ID information stored in a local database and indexed by the home unit ID 404), etc. Control then proceeds to block 516 at which the central facility 328 uses the hash ID generated at block 514 to cross-reference the VOD server hashed database received at block 504. If a match is found (block 520), control proceeds to block 524 at which the central facility 328 selects the corresponding entry or entries in the VOD server hashed database and combines the selected VOD server metering data with the reported viewing record 400 being processed (e.g., by replacing the generic VOD data 416 with specific VOD server metering data included in the VOD server hashed database). If, however, a cross-referencing match is not found (block 520), control proceeds to block 528 at which the central facility 328 indicates that VOD server metering information is not available for the viewing record 400 being processed. Control then proceeds from either block 524 or block 528 to block 532.

At block 532, the central facility 328 determines whether the viewing record 400 is the last viewing record to be processed. If the viewing record 400 is not the last record to be processed (block 532), control returns to block 508 and blocks subsequent thereto at which the central facility 328 processes the next received viewing record. Conversely, if the viewing record 400 is the last record to be processed (block 532), control proceeds to block 536 at which the central facility 328 generates ratings/metering reports for home sites that reported viewing records 400 corresponding to the presentation of VOD programming content. The example process 500 then ends.

One having ordinary skill in the art will appreciate that the processing represented by blocks 508 through 536 may be executed, for example, on an event-driven basis corresponding to the receipt of one or more viewing records from one or more households. Such processing may also be iterated multiple times, for example, one iteration for each received viewing record, one iteration for each instance of reported VOD data in a received viewing record, etc.

A block diagram of an example metering record hashing unit 600 that may be used to create the VOD server hashed database discussed above is shown in FIG. 6. In the instant example, the metering record hashing unit 600 operates on a cleartext (i.e., non-encrypted) version of a VOD server metering database (e.g., VOD server cleartext database 604) to produce a VOD server hashed database 608 in which personal subscriber data is replaced with unique subscriber hash IDs. However, the VOD metering data remains in a cleartext format (i.e., non-encrypted). Thus, processing of the VOD server hashed database 608 is greatly simplified because decrypting of the VOD server data is not required. Subscriber privacy is maintained by employing a comparison of subscriber hash IDs to retrieve VOD server data. Thus, a user of the VOD server hashed database 608 is required to already possess the requisite personal information corresponding to a subscriber in order to generate the subscriber's unique hash ID and access the corresponding VOD server data. One having ordinary skill in the art will appreciate that the contents of the cleartext database 604 and hashed database 608 may exist as individual fields in a single database, as data in multiple databases, etc.

The metering record hashing unit 600 includes a record retriever 612 to retrieve VOD metering records from the VOD server cleartext database 604. The record retriever 612 provides the retrieved metering record to at least one of a subscriber name retriever 616, a subscriber address retriever 620 and a subscriber STB ID retriever 624 to retrieve the subscriber name, address and/or STB ID, respectively, stored in the retrieved metering record. The subscriber name retriever 616, subscriber address retriever 620 and subscriber STB ID retriever 624 then provide the retrieved subscriber name, address and STB ID, respectively, to a corresponding name formatter 628, address formatter 632 and STB ID formatter 636. In the instant example, the name formatter 628 formats the subscriber name into a bit string based on an ASCII representation of the letters in the subscriber name. Similarly, the address formatter 632 formats the subscriber address into a bit string based on an ASCII representation of the numbers and/or letters in the subscriber address. The STB ID formatter 636 may format the STB ID into a bit string based on a binary representation of the MAC (medium access control) address of the STB. One having ordinary skill in the art will appreciate that many types of data representations may be employed by the name formatter 628, address formatter 632 and STB ID formatter 636. However. it is necessary that the same formatting techniques be used by the metering record hashing unit 600 and the hashed metering database processor 800 (discussed below) so that the same hashed ID is generated for a particular subscriber.

A concatenator 640 processes the subscriber name, address and STB ID formatted by the name formatter 628, address formatter 632 and STB ID formatter 636, respectively, to create a single value (e.g., bit string) corresponding to the retrieved VOD metering record. For example, the concatenator 640 may append the formatted name, address and STB ID together to form a single, concatenated bit stream corresponding to a particular user. One having ordinary skill in the art will recognize that concatenated bit streams for different subscribers may have different lengths. Additionally, one having ordinary skill in the art will appreciate that other techniques may be used by the concatenator 640 to combine the inputs into a single output value. For example, the concatenator 640 could pad or truncate the formatted name, address and STB ID inputs to form fixed-length input bit streams and then exclusive-OR the input bit streams together to form the output bit stream. Alternatively, the output of the concatenator 640 may be padded or truncated to create a bit stream of a desired fixed length.

The concatenator 640 provides the concatenated bit stream to a hash generator 644. The hash generator 644 executes a cryptographic hashing function on the concatenated bit stream to generate a unique hash ID corresponding to the subscriber information in the retrieved VOD metering record. The hash generator 644 then stores the hash ID in association with the corresponding cleartext VOD metering data (but without any subscriber identification information) in the VOD server hashed database 608. As discussed above, the hash generator 644 may employ a hash function that is easy to compute, one-way (i.e., given the output bit string it is not possible, or at least not practical, to construct the original input string) and collision-free (i.e., given any two input bit strings it is not possible, or at least not probable, that both bit strings will produce the same output bits string). Thus, the output of the hash generator 644 will preferably be a unique hash ID that may be used in lieu of the original subscriber identification information but may still allow association of the stored, cleartext VOD metering data with a particular (but now anonymous) subscriber.

One having ordinary skill in the art will appreciate that any subscriber unique information available to both the VOD provider and the metering service/facility (e.g., any of the subscriber name, address, STB ID and/or other personal information (such as a subscriber telephone number), either alone or in combination) may be used by the metering record hashing unit 600 to generate the subscriber hash ID.

Figure 6:
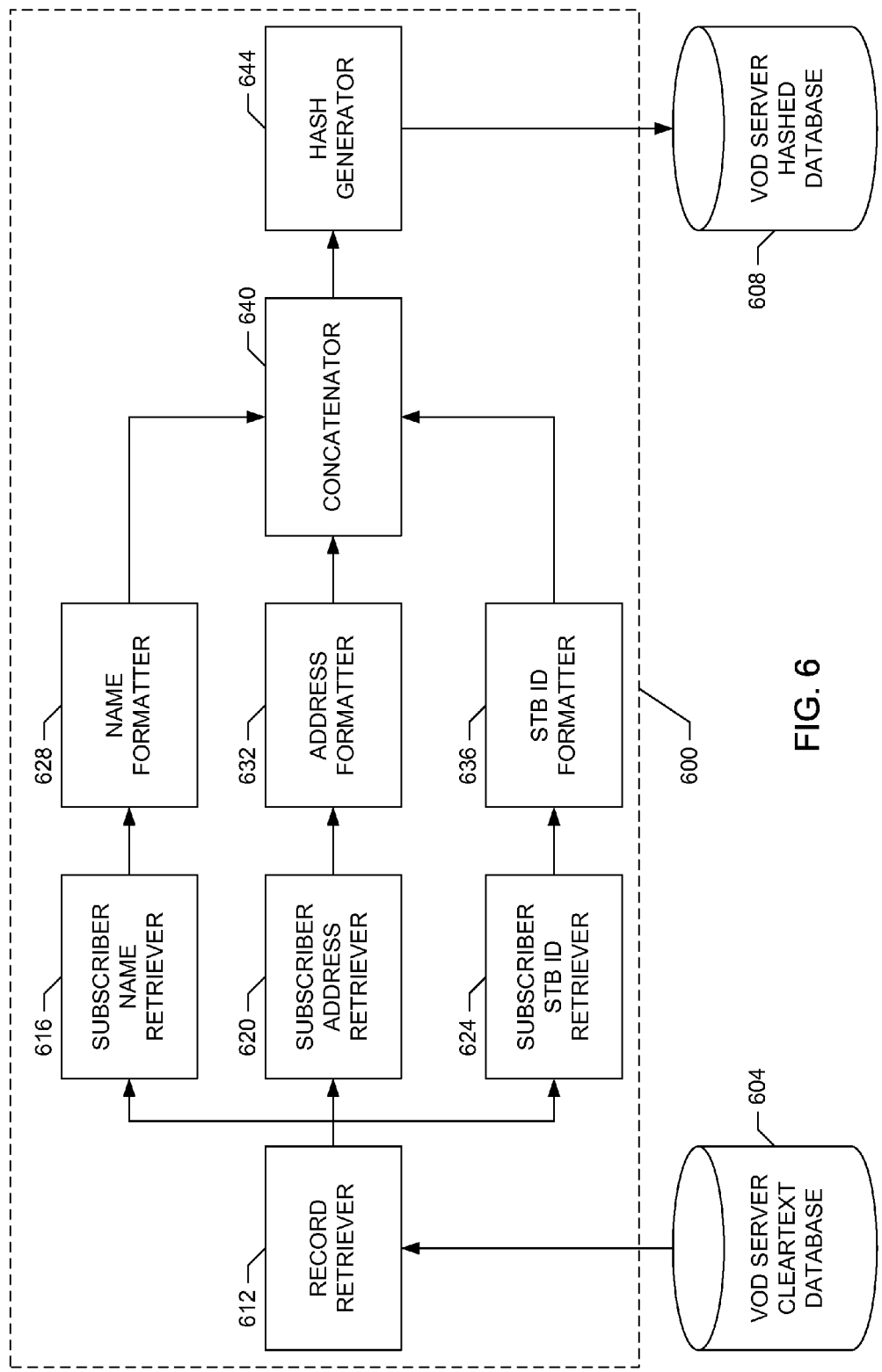
FIG. 6 is a block diagram of an example metering record hashing unit which may be used to implement at least portions of the example process of FIG. 5.
Figure 7:
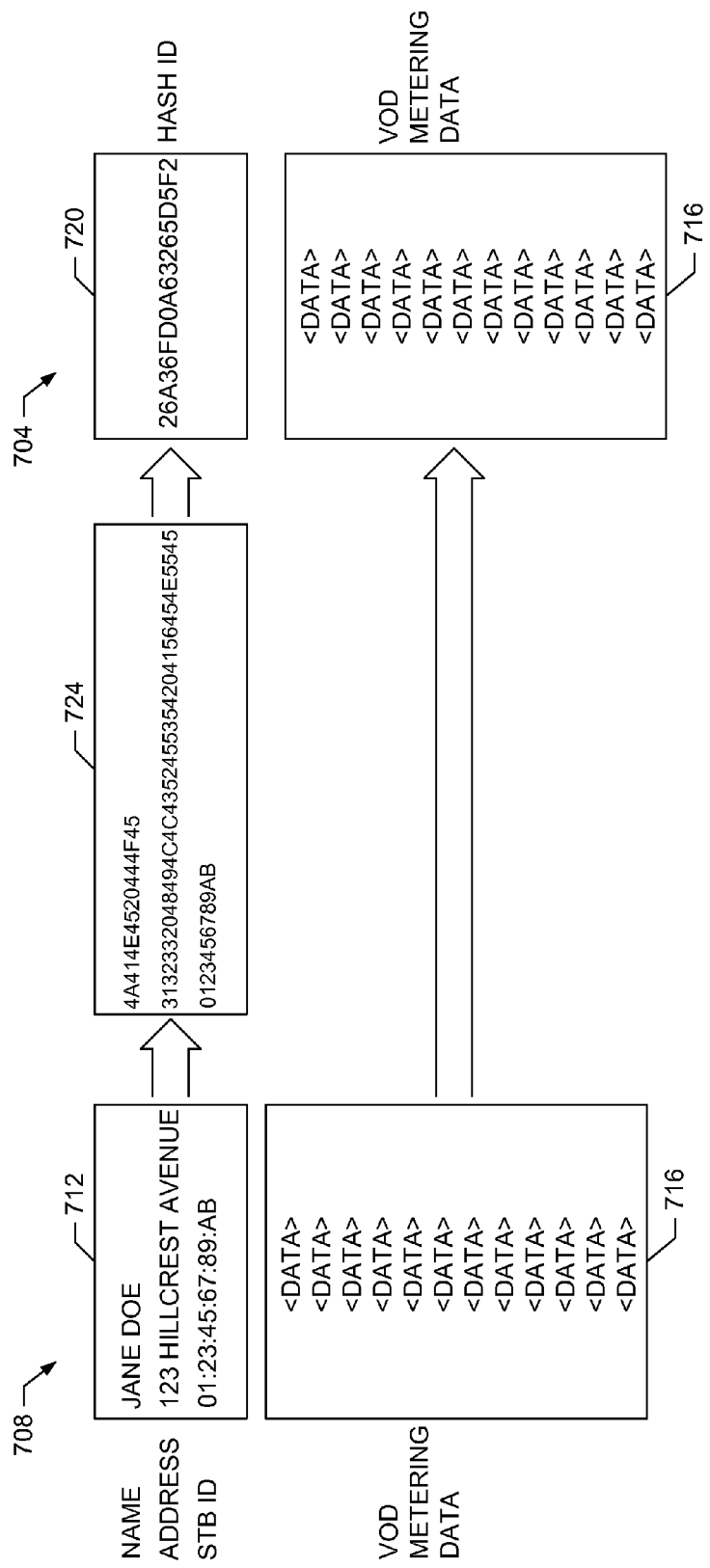
FIG. 7 illustrates an example operation of the example metering record hashing unit of FIG. 6.

To better illustrate the operation of the example metering record hashing unit 600, the generation of an example hashed VOD metering record 704 from an example cleartext VOD metering record 708 is shown in FIG. 7. The cleartext VOD metering record 708 may correspond, for example, to a record retrieved from the VOD server cleartext database 604 of FIG. 6. Similarly, the hashed VOD metering record 704 may correspond to a record stored to the VOD server hashed database 608. In the example of FIG. 7, the cleartext VOD metering record 708 includes subscriber identification information 712 and subscriber VOD metering data 716. The subscriber identification information 712 may include, for example, a subscriber name, a subscriber address and a subscriber STB ID. The VOD metering data 716 may include, for example, data corresponding to the selection, display and termination of VOD programming content.

As discussed above, a metering record hashing unit, such as the metering record hashing unit 600 of FIG. 6, may transform the subscriber identification information 712 into a unique subscriber hash ID 720. To perform this transformation, the metering record hashing unit 600 of the illustrated example formats the subscriber identification information 712 into a form suitable for input to a hash generator, such as the hash generator 644. For example, the metering record hashing unit 600 may format the subscriber identification information 712 into formatted bit strings 724 based on the ASCII representation of the name and address, and the binary representation of the STB ID (shown in hexadecimal format in FIG. 7). The formatted bit strings 724 may then be concatenated and applied to the hash generator 644 to generate the unique hash ID 720. The unique hash ID 720 is then associated with the original cleartext VOD metering data 716 to form the hashed VOD metering record 704.

Figure 8:
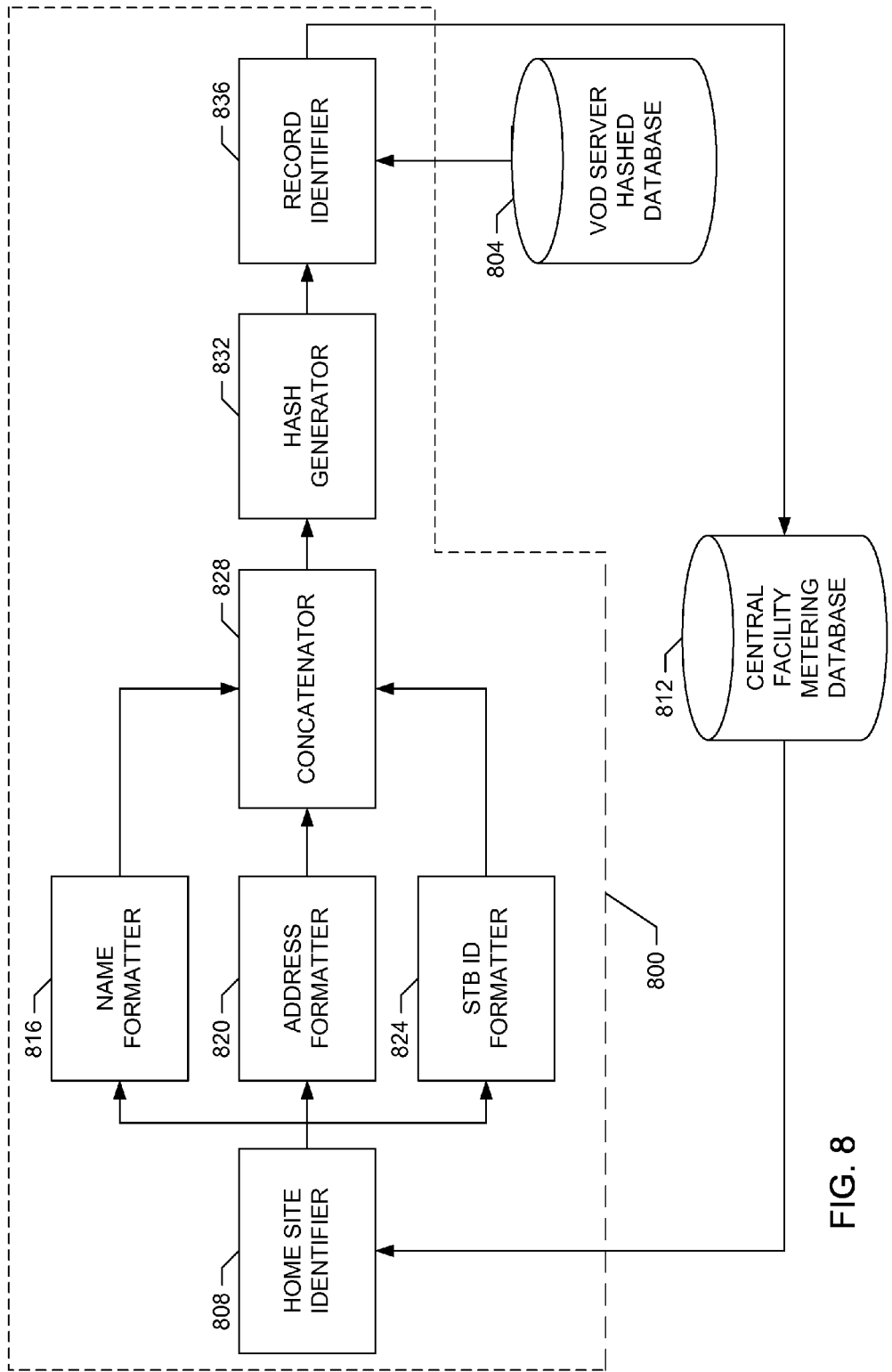
FIG. 8 is a block diagram of an example hashed metering database processor which may be used to implement at least portions of the example process of FIG. 5.

A block diagram of an example hashed metering database processor 800 that may be used to cross-reference a VOD server hashed database 804, such as the VOD server hashed database 608 of FIG. 6, is shown in FIG. 8. The hashed metering database processor 800 includes a home site identifier 808 to determine home site identification information corresponding to a viewing record (e.g., the example viewing record 400 of FIG. 4) stored in a central facility metering database 812. The home site identifier 808 may determine identification information such as a viewer name, viewer address and/or viewer STB ID based on personal information included in the viewing record 400 (e.g., a STB ID 408), personal information stored in another local database and referenced by data included in the viewing record 400 (e.g., name, address and STB ID information stored in a local database and indexed by the home unit ID 404), etc.

In the example of FIG. 8, the home site identifier 808 determines a viewer name, address and STB ID corresponding to a viewing record 400. The home site identifier 808 provides such information to the corresponding name formatter 816, address formatter 820 and STB ID formatter 824. The outputs of the formatters 816, 820, 824 are input to a concatenator 828 whose output is used by a hash generator 832 to create a unique hash ID corresponding to the home site that reported the viewing record 400 being processed. The name formatter 816, address formatter 820, STB ID formatter 824, concatenator 828 and hash generator 832 are preferably identical to the name formatter 628, address formatter 632, STB ID formatter 636, concatenator 640 and hash generator 644 of FIG. 6. As such, a detailed description of these structures may be found above and, in the interest of brevity, these structures are not discussed further herein. Moreover, the functionality of the name formatter 816, address formatter 820, STB ID formatter 824, concatenator 828 and hash generator 832 should be substantially identical to the functionality of the name formatter 628, address formatter 632, STB ID formatter 636, concatenator 640 and hash generator 644 so that the hashed metering database processor 800 and the metering record hashing unit 600 generate the same hash ID for the same set of input identification information.

Returning to FIG. 8, the hash ID generated by the hash generator 832 is provided to a record identifier 836. The record identifier 836 uses the input hash ID to cross-reference the VOD server hashed database 804 to identify one or more records corresponding to the generated hash ID. If such a record or records is/are found, the record identifier 836 may combine the VOD metering data in the VOD server hashed database 804 with the corresponding viewing record 400 in the central facility database 812.

Figure 9:
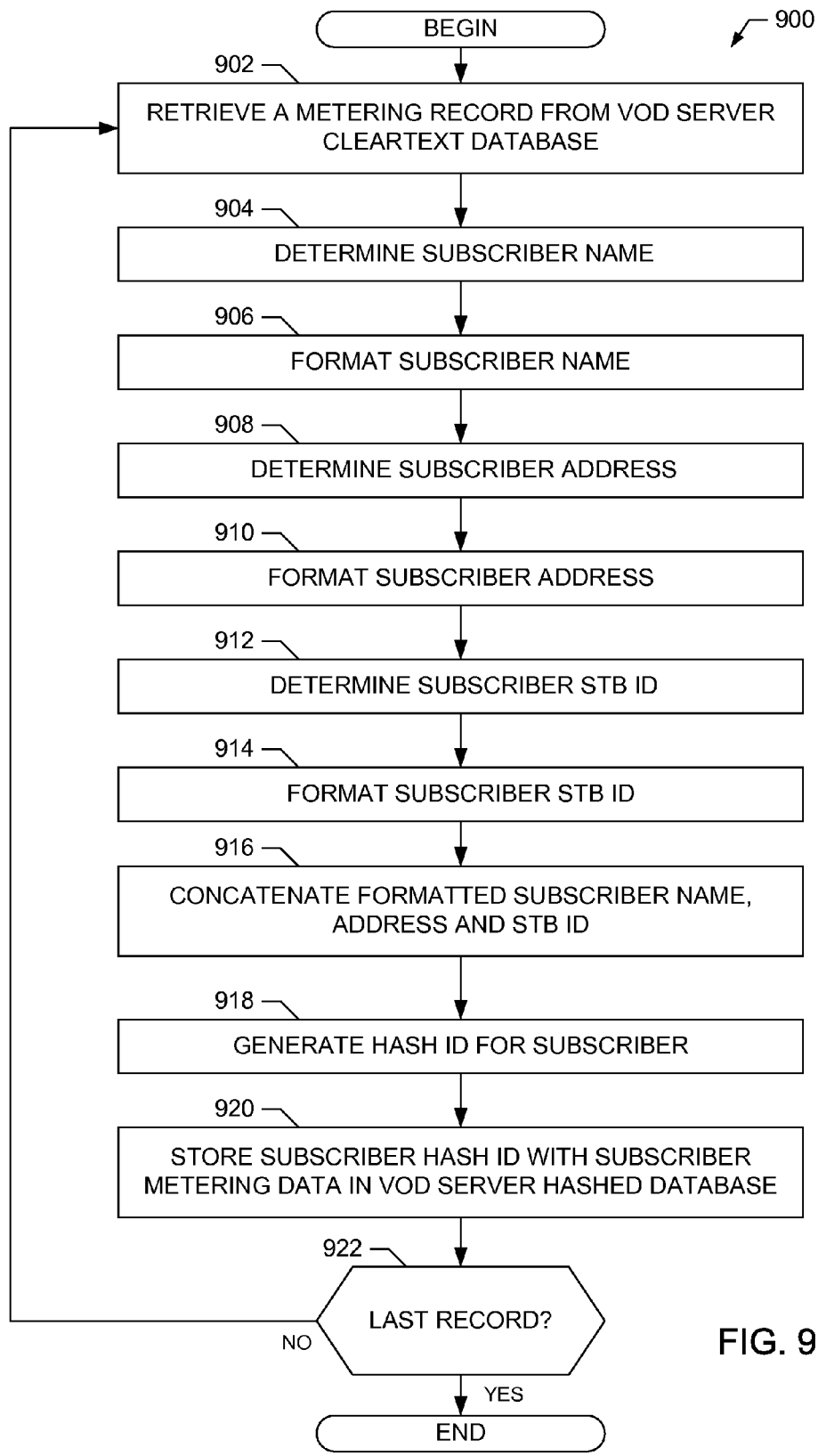
FIG. 9 is a flowchart representative of example machine readable instructions which may be executed by a machine to implement the example metering record hashing unit of FIG. 6.
Figure 10A:
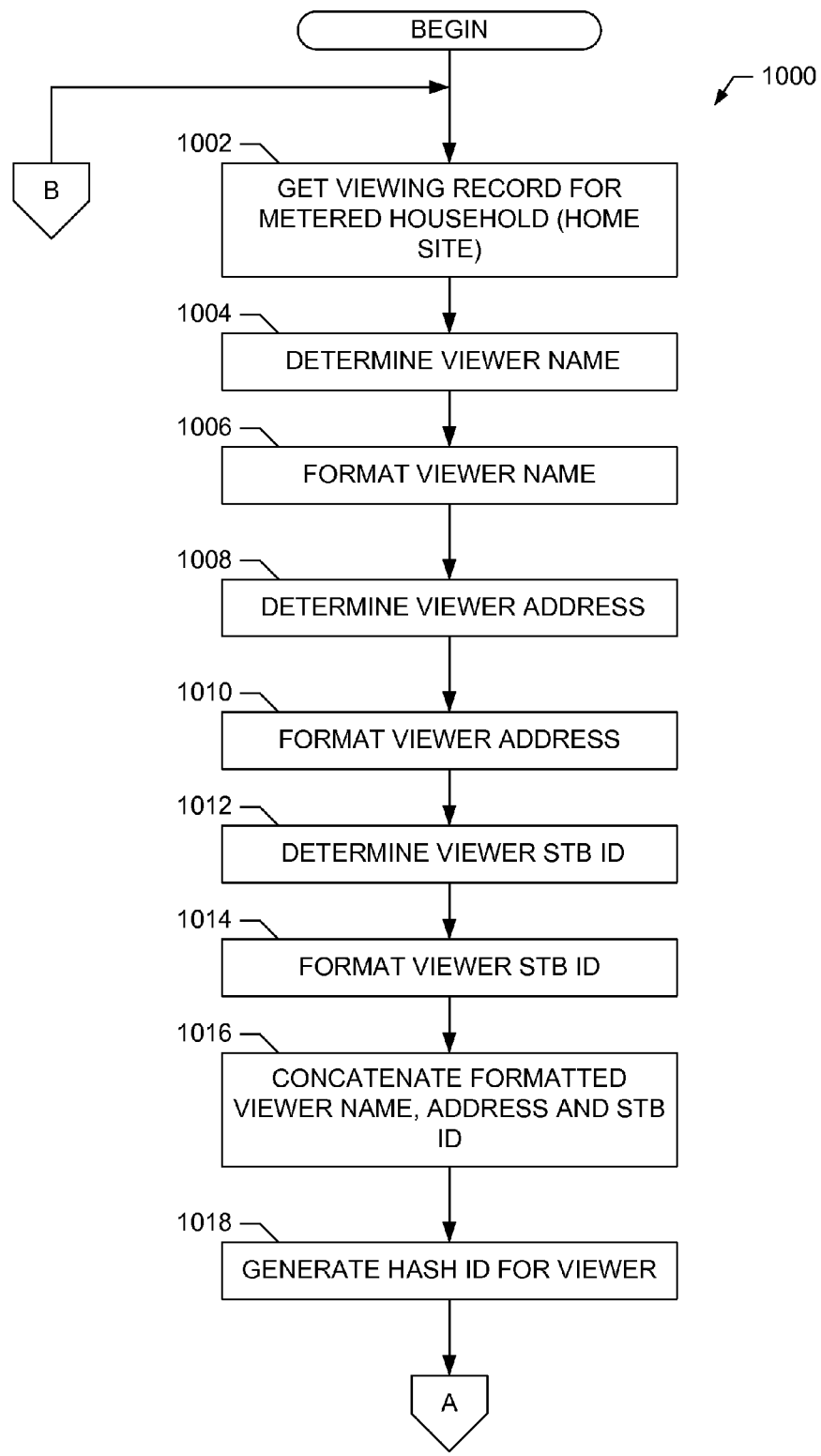
FIGS. 10A-10B are a flowchart representative of example machine readable instructions which may be executed by a machine to implement the example hashed metering database processor of FIG. 8.
Figure 10B:
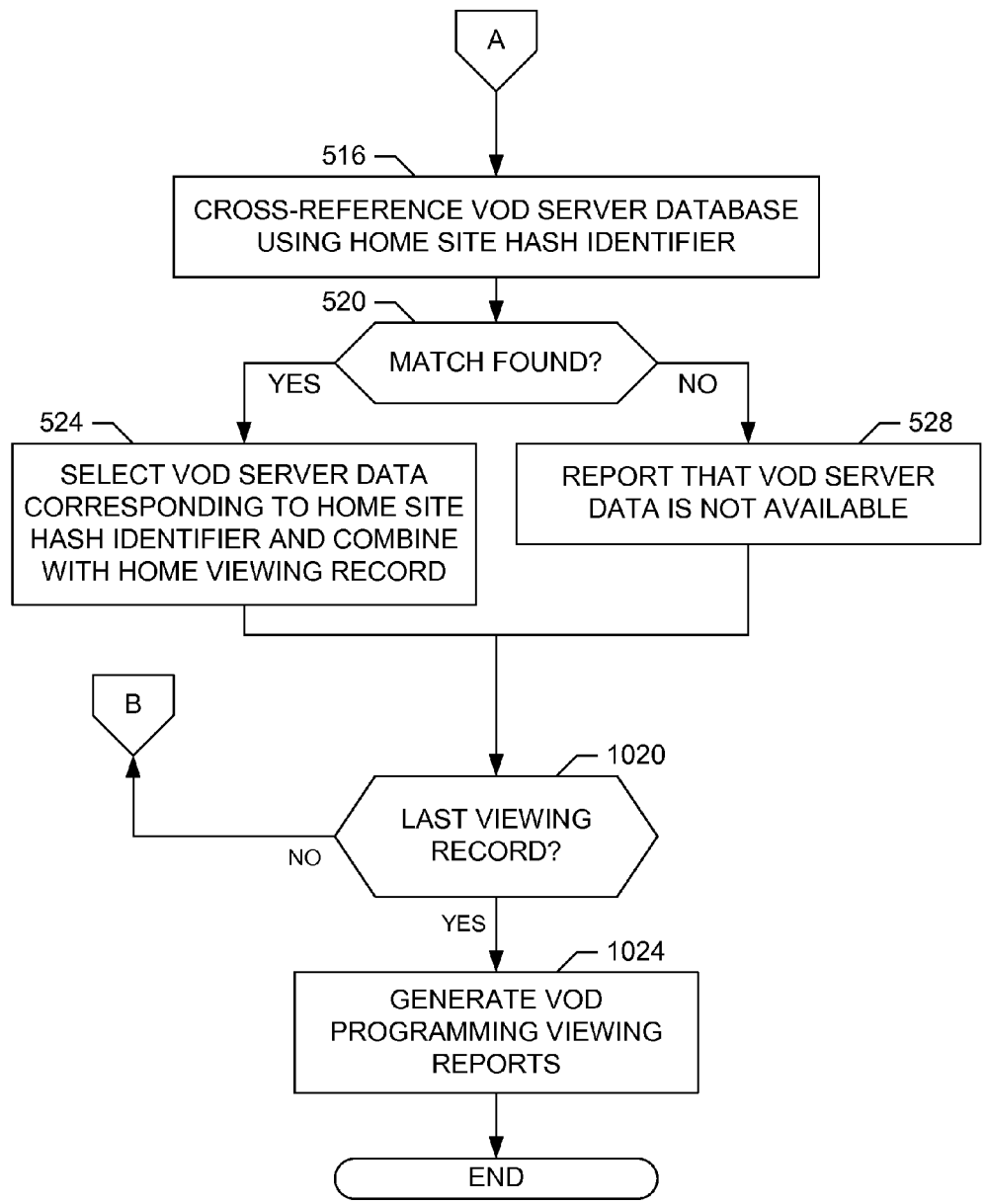

Flowcharts representative of example machine readable instructions for implementing the metering record hashing unit 600 of FIG. 6 and the hashed metering database processor 800 of FIG. 8 are shown in FIGS. 9 and 10A-10B, respectively. In these examples, the processes represented by each flowchart may be implemented by a set of machine readable instructions that may comprise one or more programs for execution by a processor, such as the processor 1112 shown in the example computer 1100 discussed below in connection with FIG. 11. The one or more programs may be embodied in software stored on a tangible medium such as a CD-ROM, a floppy disk, a hard drive, a DVD, or a memory associated with the processor 1112.

Alternatively, the entire program and/or portions thereof implementing one or more of the processes represented by the flowcharts of FIGS. 9 and 10A-10B could be executed by a device other than the processor 1112 and/or embodied in firmware or dedicated hardware. For example, any or all of the metering record hashing unit 600, any portion(s) thereof, the hashed metering database processor 800, and/or any portion(s) thereof could be implemented by any combination of software, hardware, and/or firmware. Further, although the example programs are described with reference to the flowcharts illustrated in FIGS. 9 and 10A-10B, many other techniques for implementing the example methods and apparatus described herein may alternatively be used. For example, with reference to the flowcharts illustrated in FIGS. 9 and 10A-10B, the order of execution of the blocks may be changed, and/or some of the blocks described may be changed, eliminated, combined and/or subdivided into multiple blocks.

An example program 900 to implement the example metering record hashing unit 600 of FIG. 6 is shown in FIG. 9. The example program 900 may be used to create the VOD server hashed database (or contents thereof) provided as input to the example process 500 of FIG. 5. The program 900 may be executed in response to, for example, a request from a central facility, such as the central facility 328 of FIG. 3, to send a VOD server hashed database for processing. The example program 900 begins at block 902 at which the metering record hashing unit 600 retrieves a metering record, such as the cleartext VOD metering record 708 of FIG. 7, from a VOD server cleartext database, such as the VOD server cleartext database 604 of FIG. 6. Then, at block 904 the metering record hashing unit 600 determines the subscriber name corresponding to the cleartext VOD metering record 708. The metering record hashing unit 600 formats the subscriber name at block 906 into a form suitable for input to a cryptographic hashing function, for example, by transforming the subscriber name into a bit string based on the ASCII representation of the letters comprising the name. Control then proceeds to block 908.

At block 908, the metering record hashing unit 600 determines the subscriber address corresponding to the cleartext VOD metering record 708. The metering record hashing unit 600 formats the subscriber address at block 910 into a form suitable for input to a cryptographic hashing function, for example, by transforming the subscriber address into a bit string based on the ASCII representation of the numbers and/or letters comprising the address. Control then proceeds to block 912 at which the metering record hashing unit 600 determines the subscriber STB ID corresponding to the cleartext VOD metering record 708. The metering record hashing unit 600 formats the subscriber STB ID at block 914 into a form suitable for input to a cryptographic hashing function, for example, by transforming the subscriber STB ID into a bit string based on the binary representation of the STB MAC address. Control then proceeds to block 916.

At block 916, the metering record hashing unit 600 concatenates the formatted subscriber name, address and STB ID into a single cleartext bit string that identifies the subscriber corresponding to the cleartext VOD metering record 708. The metering record hashing unit 600 inputs this concatenated bit string into a cryptographic hashing function at block 918 to generate a unique hash ID corresponding to the particular subscriber (e.g., the unique hash ID 720 of FIG. 7). As discussed above, any well-known cryptographic hashing function may be employed at block 918, such as the MD-2, MD-4 and MD-5 message digest algorithms available as Internet RFCs 1319, 1320 and 1321, respectively, the SHS family of algorithms defined by NIST, etc.

After generation of the hash ID 720 at block 918, control proceeds to block 920 at which the metering record hashing unit 600 stores the unique hash ID 720 and the original VOD metering data (e.g., the original VOD metering data 716) to a hashed VOD metering record (e.g., the hashed VOD metering record 704) in a hashed version of the VOD server metering database (e.g., the VOD server hashed database 608 of FIG. 6). Control then proceeds to block 922 at which the metering record hashing unit 600 determines whether the cleartext VOD metering record 708 is the last record in the VOD server cleartext database 604. If the cleartext VOD metering record 708 is not the last record (block 922), control returns to block 902 and blocks subsequent thereto at which the metering record hashing unit 600 processes the next cleartext VOD metering record in the VOD server cleartext database 604. Conversely, if the cleartext VOD metering record 708 is the last record in the VOD server cleartext database 604 (block 922), then the example program 900 ends.

Although the above example employs specific examples of personal information to generate the subscriber hash ID, one having ordinary skill in the art will appreciate that any combination of personal information may be used by the metering record hashing unit 600 to generate the subscriber hash ID.

An example program 1000 to implement the example hashed metering database processor 800 of FIG. 8 is shown in FIGS. 10A-10B. The example program 1000 may be used to cross-reference the VOD server hashed database (or contents thereof) provided as input to the example process 500 of FIG. 5. The program 1000 may be executed in response to, for example, receipt of one or more viewing records, such as the example viewing record 400 of FIG. 4, by a central facility, such as the central facility 328 of FIG. 3. The example program 1000 begins at block 1002 of FIG. 10A at which the hashed metering database processor 800 retrieves the viewing record 400 from a central facility metering database, such as the central facility metering database 812 of FIG. 8. Then, at block 1004 the hashed metering database processor 800 determines the viewer name corresponding to the example viewing record 400. The hashed metering database processor 800 formats the viewer name at block 1006 into a form suitable for input to a cryptographic hashing function, for example, by transforming the subscriber name into a bit string based on the ASCII representation of the letters comprising the name. Control then proceeds to block 1008.

At block 1008, the hashed metering database processor 800 determines the viewer address corresponding to the viewing record 400. The hashed metering database processor 800 formats the viewer address at block 1010 into a form suitable for input to a cryptographic hashing function, for example, by transforming the viewer address into a bit string based on the ASCII representation of the numbers and/or letters comprising the address. Control then proceeds to block 1012 at which the hashed metering database processor 800 determines the viewer STB ID corresponding to the viewing record 400. The hashed metering database processor 800 formats the viewer STB ID at block 1014 into a form suitable for input to a cryptographic hashing function, for example, by transforming the viewer STB ID into a bit string based on the binary representation of the STB MAC address. As discussed above, the hashed metering database processor 800 may determine the viewer name, address and/or STB ID based on personal information included in the viewing record 400 (e.g., a STB ID 408), personal information stored in another local database and referenced by data included in the viewing record 400 (e.g., name, address and STB ID information stored in a local database and indexed by the home unit ID 404), etc.

After the processing at block 1014 completes, control then proceeds to block 1016 at which the hashed metering database processor 800 concatenates the formatted viewer name, address and STB ID into a single bit string that identifies the viewer corresponding to the viewing record 400. The hashed metering database processor 800 inputs this concatenated bit string into a cryptographic hashing function at block 1018 to generate a unique hash ID corresponding to the particular viewer. As discussed above, any well-known cryptographic hashing function may be employed at block 1018. However, one having ordinary skill in the art will recognize that the formatting performed by blocks 1006, 1010 and 1014, the concatenation performed by block 1016 and the hashing function performed by block 1018 should match the corresponding functionality used by the metering record hashing unit (e.g., the metering record hashing unit 600) that generated the VOD server hashed database (e.g., the VOD server hashed database 608) provided as input to the example program 1000. Otherwise, the hash ID generated at block 1018 will not correspond to the type of hash IDs stored in the VOD server hashed database 608 and, thus, any attempt to cross-reference the VOD server hashed database 608 with such a generated hash ID will fail. Assuming that the hash ID generated at block 1018 was based on the appropriate formatting, concatenation and cryptographic hash function, control then proceeds to block 516 of FIG. 10B.

At block 516 of FIG. 10B the hashed metering database processor 800 cross-references the VOD server hashed database 608 based on the unique hash ID generated at block 1018 of FIG. 10A. Then, at blocks 520, 524 and 528 the hashed metering database processor 800 may combine the VOD data reported in the viewing record 400 with the corresponding, specific VOD content information included in the VOD server hashed database 608 and corresponding to the unique viewer hash ID. The functionality of blocks 516, 520, 524 and 528 is substantially similar to the corresponding blocks of FIG. 5 and, thus, these blocks are not described in further detail herein. After the processing performed at these blocks completes, and the hashed metering database processor 800 appropriately combines the viewing record 400 with the data included in the VOD server hashed database 608, control proceeds to block 1020.

At block 1020 the hashed metering database processor 800 determines whether the viewing record 400 is the last viewing record in the central facility metering database 812 to be processed. If the viewing record 400 is not the last record to be processed (block 1020), control returns to block 1002 of FIG. 10A and blocks subsequent thereto at which the hashed metering database processor 800 processes the next viewing record in the central facility metering database 812. Conversely, if the viewing record 400 is the last record to be processed (block 1020), control proceeds to block 1024 at which the central facility 328 generates ratings/metering reports based on the potentially updated viewing records 400 stored in the central facility metering database 812. The example program 1000 then ends.

Figure 11:
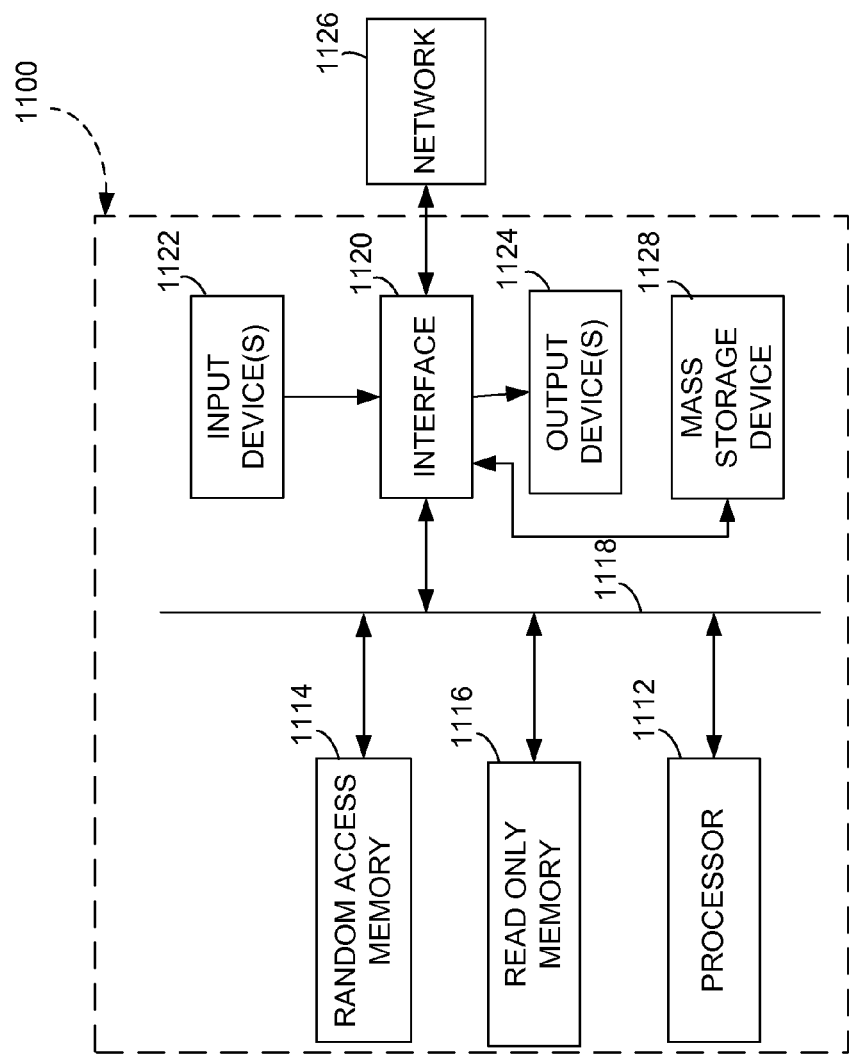
FIG. 11 is a block diagram of an example computer that may be used to implement the example programs represented by the flowcharts of FIGS. 9 and 10A-10B.

FIG. 11 is a block diagram of an example computer 1100 capable of implementing the apparatus and methods disclosed herein. The computer 1100 can be, for example, a server, a personal computer, a personal digital assistant (PDA), an Internet appliance, or any other type of computing device.

The system 1100 of the instant example includes a processor 1112. For example, the processor 1112 can be implemented by one or more Intel® microprocessors from the Pentium® family, the Itanium® family or the XScale® family. Of course, other processors from other families are also appropriate. One or more processors such as processor 1112 may be used to implement any or all of the home unit 124 and/or the STB 108 (or portions thereof) of FIG. 1, the central facility processor 224 (or portions thereof) of FIG. 2, the VOD server 304 and/or the metering server interface 324 of FIG. 3, the metering record hashing unit 600 of FIG. 6 and/or the hashed metering database processor 800 of FIG. 8. A processor such as processor 1112 may also be used to implement the example programs 900 and/or 1000 of FIGS. 9 and 10A-10B, respectively.

The processor 1112 is in communication with a main memory including a volatile memory 1114 and a non-volatile memory 1116 via a bus 1118. The volatile memory 1114 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is typically controlled by a memory controller (not shown) in a conventional manner.

The computer 1100 also includes a conventional interface circuit 1120. The interface circuit 1120 may be implemented by any type of well-known interface standard, such as an Ethernet interface, a universal serial bus (USB), and/or a third generation input/output (3GIO) interface.

One or more input devices 1122 are connected to the interface circuit 1120. The input device(s) 1122 permit a user to enter data and commands into the processor 1112. The input device(s) can be implemented by, for example, a keyboard, a mouse, a touchscreen, a track-pad, a trackball, an isopoint and/or a voice recognition system.

One or more output devices 1124 are also connected to the interface circuit 1120. The output devices 1124 can be implemented, for example, by display devices (e.g., a liquid crystal display, a cathode ray tube display (CRT)), by a printer and/or by speakers. The interface circuit 1120, thus, typically includes a graphics driver card.

The interface circuit 1120 also includes a communication device such as a modem or network interface card to facilitate exchange of data with external computers via a network 1126 (e.g., an Ethernet connection, a digital subscriber line (DSL), a telephone line, coaxial cable, a cellular telephone system, etc.). The interface circuit 1120 and the network 1126 may implement the connection 140 of FIG. 1.

The computer 1100 also includes one or more mass storage devices 1128 for storing software and data. Examples of such mass storage devices 1128 include floppy disk drives, hard drive disks, compact disk (CD) drives and DVD drives. The mass storage device 1128 and/or the volatile memory 1114 may be used to store the viewing records in the home unit 124 of FIG. 1. A mass storage device such as the mass storage device 1128 may also be used to store the VOD server cleartext database 604 and/or the VOD server hashed database 608 of FIG. 6.

As an alternative to implementing the methods and/or apparatus described herein in a system such as the device of FIG. 11, the methods and or apparatus described herein may be embedded in a structure such as a processor and/or an ASIC (application specific integrated circuit).

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to share data between a service provider and a media monitoring system, the method comprising:
   accessing a data set provided by the service provider to the media monitoring system, the data set including service usage data and first encrypted identification data collected by the service provider for subscribers of the service provider, the first encrypted identification data being encrypted to hide identities of the subscribers from the media monitoring system;
   encrypting, with a processor, a combination of first and second personal identification data retrieved based on device identification data associated with a monitored device to determine second encrypted identification data;
   comparing, with the processor, a value of the second encrypted identification data with values of the first encrypted identification data in the data set to identify an entry of the data set that is associated with the second encrypted identification data; and
   adding, with the processor, a respective portion of the service usage data associated with the identified entry of the data set to a database of the media monitoring system.

2. The method of claim 1, further including using the portion of the service usage data added to the database of the media monitoring system to perform audience measurement.

3. The method of claim 1, wherein the monitored device is a first monitored device, the second encrypted identification data further includes encrypted combinations of personal identification data retrieved based on respective device identification data associated with a plurality of monitored devices including the first monitored device, and subscribers of the service provider who are not associated with the second encrypted identification data are not identifiable to the media monitoring system from the first encrypted identification data.

4. The method of claim 1, wherein the service usage data and the first encrypted identification data in the data set correspond to respective ones of substantially all of the subscribers of the service provider.

5. The method of claim 4, wherein the monitored device is a first monitored device, the second encrypted identification data further includes encrypted combinations of personal identification data retrieved based on respective device identification data associated with a plurality of monitored devices including the first monitored device, and further including discarding portions of the service usage data from the data set corresponding to subscribers of the service provider that are not identified as associated with the second encrypted identification data.

6. The method of claim 1, wherein the first encrypted identification data is determined based on device identifiers associated with the subscribers.

7. The method of claim 1, wherein the first encrypted identification data is encrypted using a hash function, and encrypting the combination of the first and the second personal identification data includes processing the combination of the first and the second identification data with the hash function to determine the second encrypted identification data.

8. A tangible computer readable storage device or storage disk comprising computer readable instructions which, when executed, cause a computing device to at least:
   access a data set provided by a service provider to a media monitoring system, the data set including service usage data and first encrypted identification data collected by the service provider for subscribers of the service provider, the first encrypted identification data being encrypted to hide identities of the subscribers from the media monitoring system;
   encrypt a combination of first and second personal identification data retrieved based on device identification data associated with a monitored device to determine second encrypted identification data;
   compare a value of the second encrypted identification data with values of the first encrypted identification data in the data set to identify an entry of the data set that is associated with the second encrypted identification data; and add a respective portion of the service usage data associated with the identified entry of the data set to a database of the media monitoring system.

9. The storage device or storage disk of claim 8, wherein the instructions, when executed, further cause the computing device to use the portion of the service usage data added to the database of the media monitoring system to perform audience measurement.

10. The storage device or storage disk as defined of claim 8, wherein the monitored device is a first monitored device, the second encrypted identification data further includes encrypted combinations of personal identification data retrieved based on respective device identification data associated with a plurality of monitored devices including the first monitored device, and subscribers of the service provider who are not associated with the second encrypted identification data are not identifiable to the media monitoring system from the first encrypted identification data.

11. The storage device or storage disk of claim 8, wherein the service usage data and the first encrypted identification data in the data set correspond to substantially all of the subscribers of the service provider.

12. The storage device or storage disk of claim 11, wherein the monitored device is a first monitored device, the second encrypted identification data further includes encrypted combinations of personal identification data retrieved based on respective device identification data associated with a plurality of monitored devices including the first monitored device, and the instructions, when executed, further cause the computing device to discard portions of the service usage data from the data set corresponding to subscribers of the service provider that are not identified as associated with the second encrypted identification data.

13. The storage device or storage disk of claim 8, wherein the first encrypted identification data is determined based on device identifiers associated with the subscribers.

14. The storage device or storage disk of claim 8, wherein the first encrypted identification data is encrypted using a hash function, and the instructions, when executed, further cause the computing device to encrypt the combination of the first and the second personal identification data by processing the combination of the first and the second identification data with the hash function to determine the second encrypted identification data.

15. An apparatus to share data between a service provider and a media monitoring system, the apparatus comprising:
a data interface to access a data set provided by the service provider to the media monitoring system, the data set including service usage data and first encrypted identification data collected by the service provider for subscribers of the service provider, the first encrypted identification data being encrypted to hide identities of the subscribers from the media monitoring system;

a hash generator implemented with hardware to encrypt a combination of first and second personal identification data retrieved based on device identification data associated with a monitored device to determine second encrypted identification data; and a record identifier to:
compare a value of the second encrypted identification data with values of the first encrypted identification data in the data set to identify an entry of the data set that is associated with the second encrypted identification data; and add a respective portion of the service usage data associated with the identified entry of the data set to a database of the media monitoring system.

16. The apparatus of claim 15, further including a processor to use the portion of the service usage data added to the database of the media monitoring system to perform audience measurement.

17. The apparatus of claim 15, wherein the monitored device is a first monitored device, the second encrypted identification data further includes encrypted combinations of personal identification data retrieved based on respective device identification data associated with a plurality of monitored devices including the first monitored device, and subscribers of the service provider who are not associated with the second encrypted identification data are not identifiable to the media monitoring system from the first encrypted identification data.

18. The apparatus of claim 15, wherein the service usage data and the first encrypted identification data in the data set correspond to respective ones of substantially all of the subscribers of the service provider.

19. The apparatus of claim 15, wherein the first encrypted identification data is determined based on a plurality of device identifiers associated with the subscribers.

20. The apparatus of claim 15, wherein the first encrypted identification data is encrypted using a hash function, and the hash generator is further to encrypt the combination of the first and the second personal identification data by processing the combination of the first and the second identification data with the hash function to determine the second encrypted identification data.

* * * * *